US010387700B2

(12) United States Patent
Lee et al.

(10) Patent No.: US 10,387,700 B2
(45) Date of Patent: Aug. 20, 2019

(54) EMISSION CONTROL SYSTEM USING BARCODE INFORMATION

(71) Applicant: Hanam Artec Co., Ltd., Uiwang-si, Gyeonggi-do (KR)

(72) Inventors: Gil Won Lee, Bucheon-si (KR); Ho Lim Song, Seoul (KR); Jung Min Choi, Seoul (KR); Kyung Il Choi, Seoul (KR)

(73) Assignee: Hanam Artec Co., Ltd., Uiwang-si (KR)

( * ) Notice: Subject to any disclaimer, the term of this patent is extended or adjusted under 35 U.S.C. 154(b) by 197 days.

(21) Appl. No.: 15/336,815

(22) Filed: Oct. 28, 2016

(65) Prior Publication Data

US 2017/0249489 A1    Aug. 31, 2017

(30) Foreign Application Priority Data

Feb. 29, 2016  (KR) .......................... 10-2016-0024061
Mar. 11, 2016  (KR) .......................... 10-2016-0029824

(51) Int. Cl.
*G06K 7/10*      (2006.01)
*H04W 4/80*    (2018.01)
(Continued)

(52) U.S. Cl.
CPC ..... *G06K 7/10742* (2013.01); *G06K 7/10881* (2013.01); *G06K 19/06028* (2013.01);
(Continued)

(58) Field of Classification Search
USPC .................................................. 235/462.06
See application file for complete search history.

(56) References Cited

U.S. PATENT DOCUMENTS 3,981,002  A  *  9/1976  Gardner ................. G04G 9/107
                                                                345/2.1
4,458,540  A  *  7/1984  Little ....................... G01F 1/06
                                                                345/40
(Continued)

FOREIGN PATENT DOCUMENTS

CN      103875215  A      6/2014
GB       2440784  A      2/2008
(Continued)

OTHER PUBLICATIONS

Korean Office Action for corresponding Korean Patent Application No. 10-2016-0024061 dated Sep. 9, 2016.
(Continued)

*Primary Examiner* — Michael G Lee
*Assistant Examiner* — David Tardif
(74) *Attorney, Agent, or Firm* — Studebaker & Brackett PC

(57) ABSTRACT

Disclosed are an emission control system and mater and slave devices for the emission control system. The master device controlling one or more slave devices includes a communication unit, an electrical code identification unit identifying electrical code information previously output, an information check unit checking emission position information previously set in accordance with the identified electrical code information and indicating specific positions at which the slave devices emit a light, an information providing unit providing the checked emission position information to a first slave device corresponding to one of the slave devices, and an emission control unit broadcasting the emission control signal corresponding to the emission position information through the communication unit.

18 Claims, 18 Drawing Sheets

(51) Int. Cl.
*H05B 37/02* (2006.01)
*G06K 19/06* (2006.01)
*H04W 84/20* (2009.01)

(52) U.S. Cl.
CPC ............ *H04W 4/80* (2018.02); *H05B 37/029* (2013.01); *H05B 37/0272* (2013.01); *H04W 84/20* (2013.01)

(56) References Cited

U.S. PATENT DOCUMENTS

| | | | |
|---|---|---|---|
| 2006/0097660 A1 | 5/2006 | Scott et al. | |
| 2009/0230894 A1* | 9/2009 | De Goederen | H05B 37/0272 315/314 |
| 2012/0299509 A1 | 11/2012 | Lee et al. | |
| 2014/0300276 A1 | 10/2014 | Wang | |
| 2015/0179029 A1 | 6/2015 | Bailey et al. | |
| 2017/0299698 A1* | 10/2017 | Yagi | G01S 7/4814 |

FOREIGN PATENT DOCUMENTS

| | | |
|---|---|---|
| JP | S56-124995 U | 9/1981 |
| JP | 2003-036981 A | 2/2003 |
| JP | 2003-229284 A | 8/2003 |
| JP | 2005-071853 A | 3/2005 |
| JP | 2007-005094 A | 1/2007 |
| JP | 2009-070832 A | 4/2009 |
| JP | 2014-130681 A | 7/2014 |
| JP | 2014-212021 A | 11/2014 |
| JP | 2014-529844 A | 11/2014 |
| JP | 2015-002958 A | 1/2015 |
| JP | 2015-011981 A | 1/2015 |
| JP | 2015-115317 A | 6/2015 |
| KR | 20-1994-0005504 Y1 | 8/1994 |
| KR | 10-2007-0053468 A | 5/2007 |
| KR | 10-0920023 B1 | 10/2009 |
| KR | 10-2014-0000765 A | 1/2014 |
| KR | 10-2014-0081282 A | 7/2014 |
| KR | 10-2015-0009405 A | 1/2015 |
| KR | 10-2015-0055938 A | 5/2015 |

OTHER PUBLICATIONS

Korean Office Action for corresponding Korean Patent Application No. 10-2016-0029824 dated Sep. 6, 2016.
An Office Action mailed by the Korean Intellectual Property Office dated Feb. 15, 2019, which corresponds to Korean Patent Application No. 10-2019-0015085 and is related to U.S. Appl. No. 15/336,815.
An Office Action mailed by the Korean Intellectual Property Office dated Aug. 14, 2018, which corresponds to Korean Patent Application No. 10-2018-0013534 and is related to U.S. Appl. No. 15/336,815.
An Office Action mailed by the Japanese Patent Office dated Aug. 15, 2017, which corresponds to Japanese Patent Application No. 2016-218180 and is related to U.S. Appl. No. 15/336,815.
An Office Action mailed by the State Intellectual Property Office of the People's Republic of China dated May 2, 2018, which corresponds to Chinese Patent Application No. 201610950634.2 and is related to U.S. Appl. No. 15/336,815.
The extended European search report issued by the European Patent Office dated Apr. 21, 2017, which corresponds to European Patent Application No. 16196890.4 and is related to U.S. Appl. No. 15/336,815.
The extended European search report issued by the European Patent Office dated Jul. 18, 2018, which corresponds to European Patent Application No. 18159136.3 and is related to U.S. Appl. No. 15/336,815.

\* cited by examiner

EMISSION CONTROL SYSTEM USING BARCODE INFORMATION

CROSS-REFERENCE TO RELATED APPLICATIONS

A claim for priority under 35 U.S.C. § 119 is made to Korean Patent Application No. 10-2016-0024061 filed Feb. 29, 2016 and Korean Patent Application No. 10-2016-0029824 filed Mar. 11, 2016, in the Korean Intellectual Property Office, the entire contents of which are hereby incorporated by reference.

BACKGROUND

Embodiments of the inventive concept described herein relate to an emission control system, and more particularly, relate to an emission control system capable of effectively controlling an emission pattern of a plurality of emission devices by adjusting electrical code information or an intensity of a radio wave.

In general, a lighting device means a light emitting device that is used for illumination by reflecting, refracting, or transmitting a light provided from a light source. The lighting device is classified into an indirect lighting device, a semi-indirect lighting device, a general diffuse lighting device, a semi-direct lighting device, and a direct lighting device depending on the distribution of the light.

With the development of the technology, the lighting device has been used for a variety of purposes. As an example, the lighting device is used to create media facades. The media facades are layers of controllable lights attached to the exterior surface of a building to function as media screens.

As another example, the lighting device is used as a cheering tool in a sport event or a concert being held below a predetermined luminance level. However, since a plurality of lighting devices is individually controlled in such an environment, it is difficult to form systematic lighting patterns or shapes. In addition, it is not easy to achieve a cheering effect as expected by only using the light source of the lighting device.

Accordingly, a method of uniformly controlling a plurality of lighting devices is required to solve the difficulties described above.

Also, various forms of stage effects are displayed using a plurality of light emitting devices (e.g. lighting devices) for the light emitting type cheering tool used in concerts or sport events or for a structure of outer walls in a building. A director or a producer controls the light emitting devices, which are used for various purposes, individually or as a group through a central processing unit such as a master device to create various light emitting patterns. Meanwhile, in the method of controlling the light emitting devices, a light emitting control signal is transmitted from the master device to a plurality of slave devices (e.g., light emitting devices) through a wireless communication such that the various light emitting patterns are produced.

Conventionally, a position of a lighting device is calculated by using an RSSI signal for controlling a light emission of the lighting device. However, it is difficult to accurately calculate the position of the lighting device due to various factors with the conventional calculating method.

In addition, it is required to transmit data, such as pixel value, to all the plurality of lighting devices in order to display contents, e.g., animation, using the plurality of lighting devices. However, it is difficult to transmit the data to the plurality of lighting devices through wireless signal.

In a conventional method of displaying light emitting patterns, one control device (e.g., the master device) controls the operation of a plurality of light emitting devices (e.g., the slave device), and thus it is difficult to group the plurality of light emitting devices and display the light emitting patterns in real time or periodically.

Also, when using a portable light emitting device that is able to be hand carried by a person (e.g., a light emitting type cheering tool), predetermined light emitting patterns may be in disorder due to a movement of the person carrying the portable light emitting device. In this case, it is difficult to check every movement of the person and control the light emitting device carried by the person.

SUMMARY

Embodiments of the inventive concept provide an emission control system for controlling an emission of a lighting device using electrical code information previously set to predict a position of the lighting device.

Embodiments of the inventive concept provide a method of controlling an emission pattern of slave devices arranged in the vicinity of sub-master devices by controlling a radio wave intensity of at least one sub-master device in a master device.

According to an aspect of an embodiment, a master device controlling one or more slave devices includes a communication unit, an electrical code identification unit identifying electrical code information previously output, an information check unit checking emission position information previously set in accordance with the identified electrical code information and indicating specific positions at which the slave devices emit a light, an information providing unit providing the checked emission position information to a first slave device corresponding to one of the slave devices, and an emission control unit broadcasting the emission control signal corresponding to the emission position information through the communication unit.

The information check unit further checks directing information to allow the first slave device to emit the light in a pattern previously set in accordance with the emission position information, and the information providing unit further provides the directing information to the first slave device.

The directing information is information, which is activated when the emission control signal is received, to control the first slave device such that an emission unit of the first slave device emits the light distinguished by one or more predetermined periods.

The emission control unit transmits a lock signal to the slave devices to drive the first slave device in a lock mode during the predetermined period.

When a previously-set condition is satisfied, the information providing unit transmits the emission position information of the first slave device, the directing information of the first slave device, and a control signal to the first slave device, and the control signal allows the emission position information and the directing information of the first slave device to be transmitted to a second slave device disposed adjacent to the first slave device.

According to another aspect of an embodiment, a slave device controlled by a master device includes a communication unit, an emission unit including at least one light source device, an information receiving unit receiving emission position information corresponding to electrical code information previously set from the master device, and an emission control unit selectively receiving an emission control signal corresponding to the emission position information at a position corresponding to the emission position information among emission control signals broadcasted by the master device and controlling the emission unit on the basis of the received emission control signal.

The information receiving unit further receives directing information to allow the slave device to emit a light in a pattern previously set in accordance with the emission position information, and the emission control unit controls the emission unit such that the emission unit emits the light distinguished by one or more predetermined periods when receiving the emission control signal.

The emission control unit operates the slave device in a lock mode during the predetermined period when the emission control unit receives a lock signal from the master device.

When a previously-set condition is satisfied, the emission control unit controls the communication unit to transmit the emission position information to another slave device disposed adjacent to the slave device.

The emission control unit allows the emission unit to emit the light having a predetermined color when the emission position information is completely received.

The slave device outputs an emission pattern in conjunction with a user terminal of a user by transmitting the received emission control signal to the user terminal or emits the light in response to a control signal input thereto through the user terminal.

According to another aspect of an embodiment, a master device controlling one or more slave devices through at least one sub-master device includes a communication unit, an electrical code identification unit identifying electrical code information previously output, an information check unit checking emission position information previously set in accordance with the identified electrical code information and indicating a specific emission position at which a specific slave device among the slave devices emit a light, an information providing unit inserting the checked emission position information to the specific slave device, and an emission control unit providing an emission control signal to a first sub-master device through the communication unit to selectively control the emission of the specific slave device by controlling a radio wave intensity of the first sub-master device located at a position spaced apart from the specific emission position of the specific slave device.

The emission control signal includes a radio wave intensity value of the first sub-mater device and a first emission pattern value set to allow the first sub-master device to control an emission pattern of the specific slave device when the specific slave device is located in a first control radius set in accordance with the radio wave intensity value of the first sub-mater device.

The emission control signal includes a radio wave intensity value of a second sub-mater device spaced apart from the first sub-master device by a predetermined distance and a second emission pattern value set to allow the second sub-master device to control the emission pattern of the specific slave device when the specific slave device is located in a second control radius set in accordance with the radio wave intensity value of the second sub-mater device, and when the specific slave device moves to the second control radius from the first control radius, the specific slave device emitting the light in accordance with the first emission pattern value emits the light in accordance with the second emission pattern value.

When the specific slave device is disposed in both of the first control radius and the second control radius, the specific slave device emits the light having an average value of the first emission pattern value and the second emission pattern value.

The first emission pattern value and the second emission pattern value include at least one of an emission timing value, an emission color value, and an emission duration time value of the specific slave device.

The communication unit connects the master device and the first sub-mater device in a wired communication network.

According to another aspect of an embodiment, an emission control method with a control of a radio wave intensity, in which one or more slave devices are controlled by a master device through at least one sub-master device, includes identifying electrical code information previously output, checking emission position information previously set in accordance with the identified electrical code information and indicating a specific emission position at which a specific slave device among the slave devices emit a light, inserting the checked emission position information to the specific slave device, and providing an emission control signal to a first sub-master device through the communication unit to selectively control the emission of the specific slave device by controlling a radio wave intensity of the first sub-master device located at a position spaced apart from the specific emission position of the specific slave device.

According to the above, the emission position information previously set in accordance with the electrical code information of tickets are inserted into each slave device (e.g., an emission device or a lighting device), and thus various types of the emission patterns may be controlled.

In addition, the slave devices may be controlled in real time or by groups after being grouped on the basis of the emission position information, and scene having high quality may be directed by previously storing the directing information corresponding to the emission position information to the slave device. Accordingly, various emission patterns may be generated in concerts or sport events, and cheering effects caused by the various emission patterns may be improved.

Further, since the slave device is driven in the lock mode during the predetermined period, defects may be prevented from occurring on the direction using the emission.

When the emission position information is not inserted into the slave device, the emission position information is transmitted to the slave device not having the emission position information through the slave device arranged adjacent to the slave device not having the emission position information, and thus a user convenience and an efficiency of a directing operation may be improved.

In addition, according to the master device according to various embodiments of the inventive concept, the slave devices may be effectively grouped and controlled by appropriately adjusting the radio wave intensity of the sub-master devices.

Each sub-master device according to various embodiments of the inventive concept has the control radius with various forms in accordance with the control of the radio wave intensity, so that the slave devices coupled to and moving with the sub-master devices may be effectively controlled.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The inventive concept and methods of accomplishing the same may be understood more readily by reference to the following detailed description of embodiments and the accompanying drawings. However, the inventive concept may be embodied in many different forms, and should not be construed as being limited to the embodiments set forth herein. Rather, these embodiments are provided so that this disclosure will be thorough and complete and will fully convey the concept of the invention to those skilled in the art, and the inventive concept will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following descriptions, the term "emission control signal" used herein may include at least one of a "first emission control signal" and a "second emission signal". The first emission control signal may be a signal required to control a sub-master device 200 by a master device 100, and the second emission control signal may be a signal required to control a slave device 300 by the master device 100. Unless otherwise defined, the emission control signal may mean one of the first emission control signal and the second emission control and may be defined by a specific operation of the master device 100.

Hereinafter, an emission control system using machine-readable code containing data (hereinafter, referred to as "electrical code information") will be described in detail with reference to accompanying drawings.

Figure 1:
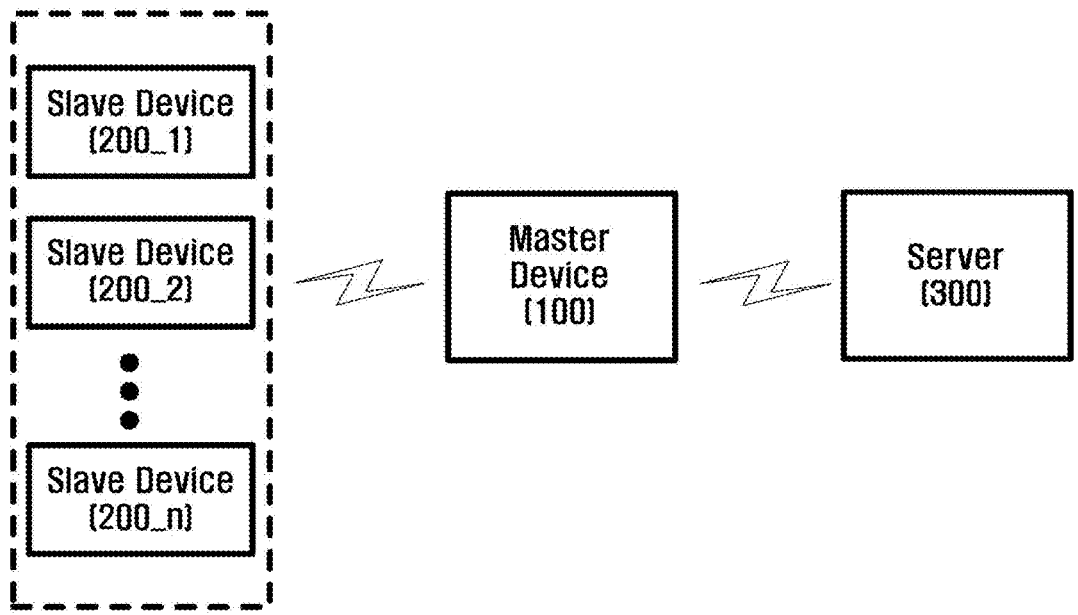
FIG. 1 is a block diagram showing an emission control system according to various exemplary embodiments of the inventive concept.

FIG. 1 is a block diagram showing an emission control system 10 according to various exemplary embodiments of the inventive concept.

The emission control system 10 includes a master device 100, a slave device 200, and a server 300. The emission control system 10 controls an emission of the slave device 200, e.g., an emission device, a lighting device, to direct various emission patterns for cheering in a concert hall.

The master device 100 may independently perform a function of controlling the emission of at least one slave device 200 or communicate with the server 300 to perform the controlling function of the emission of the slave device 200. For instance, the master device 100 may be configured to have a kiosk form, may include a portion of components of a smart phone, a tablet, a desktop personal computer, a laptop personal computer, or a netbook computer, may be one of the smart phone, the tablet, the desktop personal computer, the laptop personal computer, and the netbook computer, or may be one of various electronic devices operated in conjunction with those devices.

The slave device 200 may perform a function of directing various types of emission patterns in real time or by a predetermined interval under the control of the master device 100. The slave device 200 may be a small cheering tool in which at least a portion thereof emits a light in various shapes in sport events, concerts, etc.

The server 300 may communicate with the master device 100 and perform a function of applying various types of information, which will be provided to the slave device 200, to the master device 100. For instance, the server 300 receives electrical code information from the master device 100 and provides at least one of emission position information and directing information corresponding to the electrical code information to the master device 100.

The master device 100, the slave device 200, and the server 300 may mutually communicate with each other in various ways. For instance, the master device 100 and the slave device 200 may be connected to each other through a wireless communication, such as a RF communication, an electric tag, etc., and the master device 100 and the server 300 may be connected to each other through a telecommunication network, but they should not be limited thereto or thereby.

Figure 2:
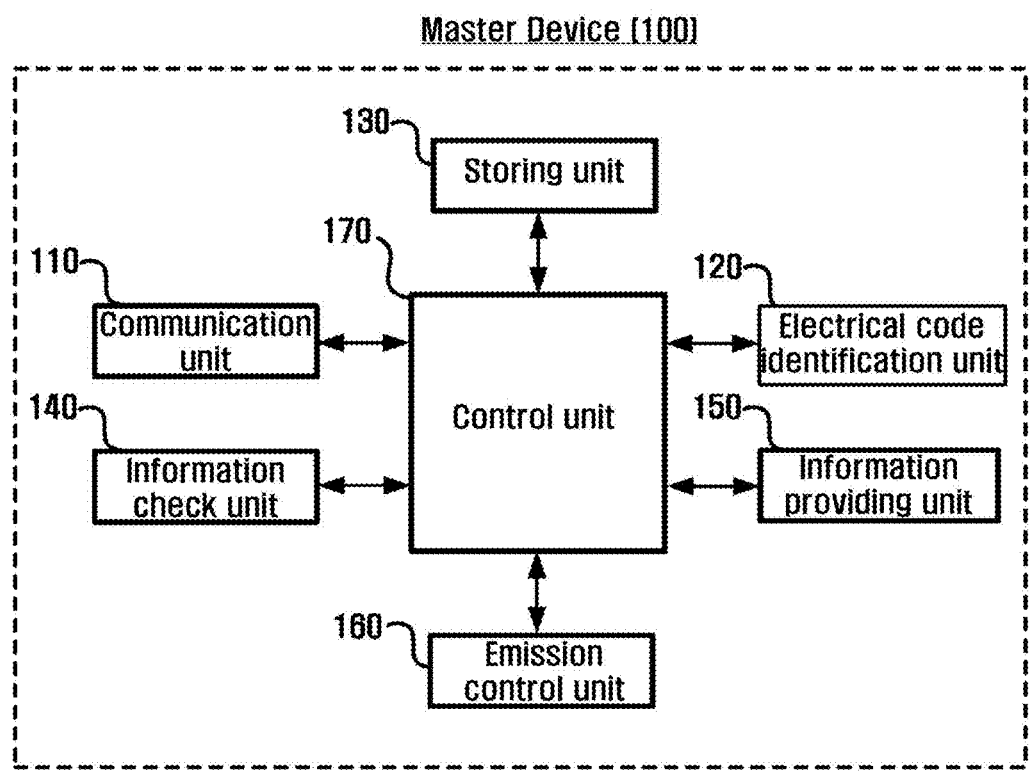
FIG. 2 is a block diagram showing a master device according to various exemplary embodiments of the inventive concept.

FIG. 2 is a block diagram showing the master device 100 according to various exemplary embodiments of the inventive concept.

The master device 100 includes a communication unit 110, an electrical code identification unit 120, a storing unit 130, an information check unit 140, an information providing unit 150, an emission control unit 160, and a control unit 170. According to various embodiments, the master device 100 may further include additional units, e.g., an input module, a display module, a power module, an audio module, etc., or some units of the master device 100 shown in FIG. 2 may be omitted.

The communication unit 110 may provide a communication between the master device 100 and the slave device 200 or between the master device 100 and the server 300. The communication unit 110 may include, for example, at least one of a wired communication module (e.g., a connector, a connector module, etc.) and a wireless communication module (e.g., an RF transceiver, a Zigbee module, a Bluetooth, a WIFI module, etc.).

The electrical code identification unit 120 may perform a function of receiving an electrical code printed on a show ticket or a concert ticket. As an example, the electrical code may be a code, such as a bar code or a QR code, in which information printed on a ticket are identified by various electronic devices, but it should not be limited thereto or thereby. The electrical code identification unit 120 may be an optical scanner or a QR code identifier that scans the electrical code to collect the electrical code information, but it should not be limited thereto or thereby. In FIG. 2, the electrical code identification unit 120 is implemented in the master device 100, but the electrical code identification unit 120 may be implemented separated from the mater device 100 according to various embodiments. In this case, the master device 100 may receive the electrical code information from the electrical code identification unit 120 through a wired or wireless network.

The storing unit 130 may store data provided from or generated by other components of the control unit 170, the master device 100, or the emission control system 10. The storing unit 130 may include, for example, a memory, a cash, a buffer, etc.

According to various embodiments, the storing unit 130 may store the electrical code information provided from the ticket, the emission position information that are previously set depending on the electrical code information, and the directing information corresponding to the emission position. The electrical code information, the emission position information, and the directing information may be implemented in a mapping table to be mutually compatible, but they should not be limited thereto or thereby.

According to some embodiments, the electrical code, which allows a position of a seat of a person who purchased the ticket in the concert hall to be checked through the master device 100 or the server 300, may be printed on the ticket. In addition, seat information, such as Korean, English, Arabic numerals, etc., may be further printed on the ticket such that the person who purchases the ticket checks the position of the seat.

According to some embodiments, the emission position information may be information that are previously set to identify or group a plurality of slave devices 200 for the directing of the show in the master device 100 or the server 300. The emission position information may be substantially the same as the seat information that are recognized by the person or may be set by adding additional identification information to the seat information, and the emission position information may be set previously or in real time by an administrator of the emission control system 10 or a show policy.

According to some embodiments, in a case that a relatively high quality emission pattern (e.g., a screen represented by images) is directed through the slave devices 200, the directing information may be previously stored (e.g., insertion) in the slave device 200 from the master device 100. In general, since data simultaneously transmitted through the wireless communication are restricted, the directing information, such as pixel information, are required to be previously provided to the slave devices 200 when the high quality emission pattern is directed. Accordingly, the master device 100 may previously provide the directing information corresponding to the emission position information to the slave device 200.

The information check unit 140 may receive the collected electrical code information from the electrical code identification unit 120 and check the emission position information corresponding to the electrical code information in the storing unit 130 or the server 300. The information check unit 140 may transmit the collected electrical code information to the server 300 from the electrical code identification unit 120 through the communication unit 110 and check the emission position information corresponding to the electrical code information in the server 300. In addition, the information check unit 140 may transmit the checked emission position information to the information providing unit 150.

The information providing unit 150 may provide (e.g., insertion) at least one of the emission position information checked by the information check unit 140 and the directing information to the slave device 200. The information providing unit 150 may transmit the emission position information or the directing information to the slave device 200 through the communication unit 110, such as an RF module.

The emission control unit 160 may broadcast an emission control signal corresponding to the emission position information through a wireless network. For instance, the emission control unit 160 may broadcast the emission control signal to the slave devices 200, and each slave device 200 may selectively receive the emission control signal corresponding to the emission position information thereof among the broadcasted emission control signals.

The control unit 170 may perform a data processing function to control an overall operation, e.g., a control of power supply, of the master device 100 and a signal flow between components in the master device 100. The control unit 170 may include at least one processor.

The information check unit 140, the information providing unit 150, and the emission control unit 160 may be functional components separately provided to distinguish at least some functions of the control unit 170 from common functions of the control unit 170. In FIG. 2, the information check unit 140, the information providing unit 150, and the emission control unit 160 are shown as separate components from the control unit 170, but the information check unit 140, the information providing unit 150, and the emission control unit 160 may be configured with the control unit 170 as a single module.

Figure 3:
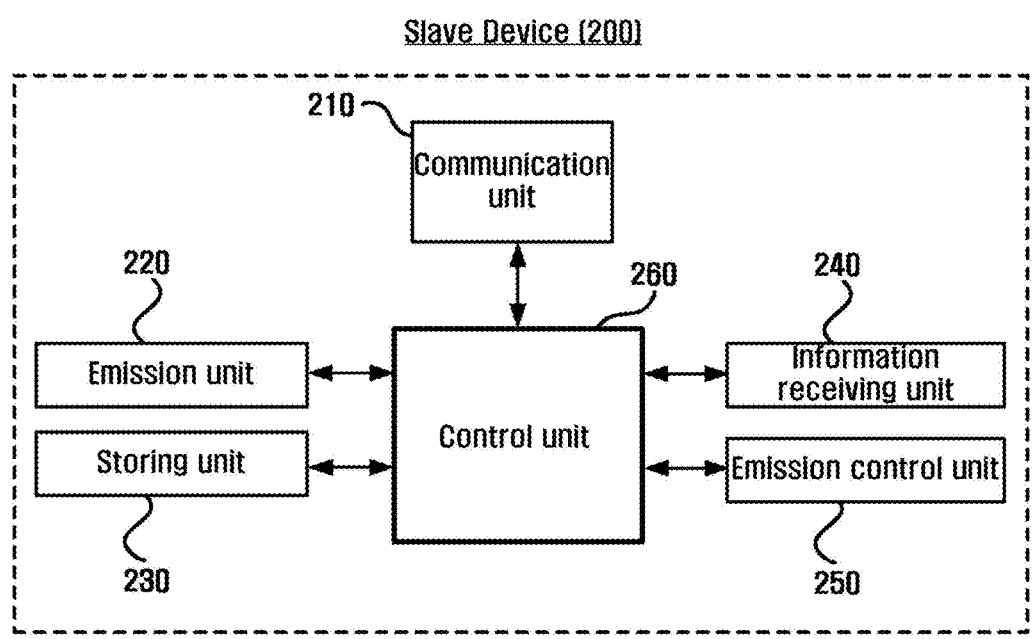
FIG. 3 is a block diagram showing a slave device according to various exemplary embodiments of the inventive concept.

FIG. 3 is a block diagram showing the slave device 200 according to various exemplary embodiments of the inventive concept.

The slave device 200 may include a communication unit 210, an emission unit 220, a storing unit 230, an information receiving unit 240, an emission control unit 250, and a control unit 260. According to various embodiments, the slave device 200 may further include additional units, e.g., an input module, a display module, a power module, an audio module, etc., or some units of the slave device 200 shown in FIG. 3 may be omitted.

The communication unit 210 may provide a communication between the master device 100 and the slave device 200. The communication unit 210 may include, for example, at least one of a wired communication module (e.g., a connector, a connector module, etc.) and a wireless communication module (e.g., an RF transceiver, a Zigbee module, a Bluetooth, a WIFI module, etc.).

According to various embodiments, the communication unit 210 of the slave device 200 may receive the emission position information and the directing information corresponding to the emission position from the master device 100 (e.g., a smart phone) using the Zigbee module or the Bluetooth module.

The emission module 220 may include one or more light source devices, e.g., a light emitting diode (LED). In addition, the emission module 220 may include LEDs having different colors from each other. For instance, the emission module 220 may include at least one of a red LED, a green LED, a blue LED, and a white LED.

When lights respectively emitted from the LEDs are mixed with each other, a color with a wide range may be obtained, and the mixed color is determined depending on a ratio of intensity of the lights emitted from the LEDs. The intensity of the lights emitted from the LEDs may be proportional to a driving current of each of the LEDs.

That is, the color of the light emitted from the emission unit 220 may be controlled by controlling the driving current of each LED. The LEDs may be arranged in a dot shape, and a specific sentence (text) or an image may be displayed by selectively turning on the LEDs.

In the present exemplary embodiment, the LED has been described as the light source of the emission unit 220, but the light source should not be limited to the LED. According to another embodiment, an organic light emitting diode (OLED) may be employed as the light source of the emission unit 220.

The storing unit 230 may store data provided from or generated by other components of the control unit 260, the slave device 200, or the emission control system 10. The storing unit 230 may include, for example, a memory, a cash, a buffer, etc.

According to various embodiments, the storing unit 230 may store the emission position information, which are previously set depending on the electrical code information, and the directing information corresponding to the emission position. In addition, the storing unit 230 may provide the stored emission position information or the directing information to the emission control unit 250 or the control unit 260 in response to a requirement from the emission control unit 250 or the control unit 260.

The information receiving unit 240 may receive the emission position information or the directing information from the master device 100 through the communication unit 210. For instance, the information receiving unit 240 may receive at least one of the emission position information and the directing information from the master device 100 through an RF communication.

The emission control unit 250 may selectively receive the emission control signal corresponding to the emission position information of the storing unit 230 among the emission control signals broadcasted by the master device 100 and control the emission unit 220 on the basis of the received emission control signal. According to various embodiments, the emission control unit 250 may receive the directing information from the master device 100 through the Zigbee module.

The control unit 260 may perform a data processing function to control an overall operation, e.g., a control of power supply, of the slave device 200 and a signal flow between components in the slave device 200. The control unit 260 may include at least one processor.

The information receiving unit 240 and the emission control unit 250 may be functional components separately provided to distinguish at least some functions of the control unit 260 from common functions of the control unit 260. In FIG. 3, the information receiving unit 240 and the emission control unit 250 are shown as separate components from the control unit 260, but the information receiving unit 240 and the emission control unit 250 may be configured with the control unit 260 as a single module.

Although not shown in figures, the slave device 200 may communicate with a user terminal (e.g., a smart phone) of a user to transmit emission-related information to the user terminal. The emission-related information may include, for example, at least one of the emission pattern, the directing information, and the emission control signal. The user terminal may emit the light in conjunction with the cheering tool (e.g., the slave device 200) on the basis of the received emission-related information. To this end, the user terminal may output the same emission pattern as the emission pattern of the slave device 200, the similar emission pattern as the emission pattern of the slave device 200, or another emission pattern previously stored corresponding to the emission pattern of the slave device 200 through a display device, e.g., a touch screen, etc., and an application may be installed in the user terminal for the above-mentioned function. According to various embodiments, the slave device 200 may communicate with the user terminal through a Bluetooth mode, and the user may directly control the emission pattern of the slave device 200 by using the user terminal.

Figure 4:
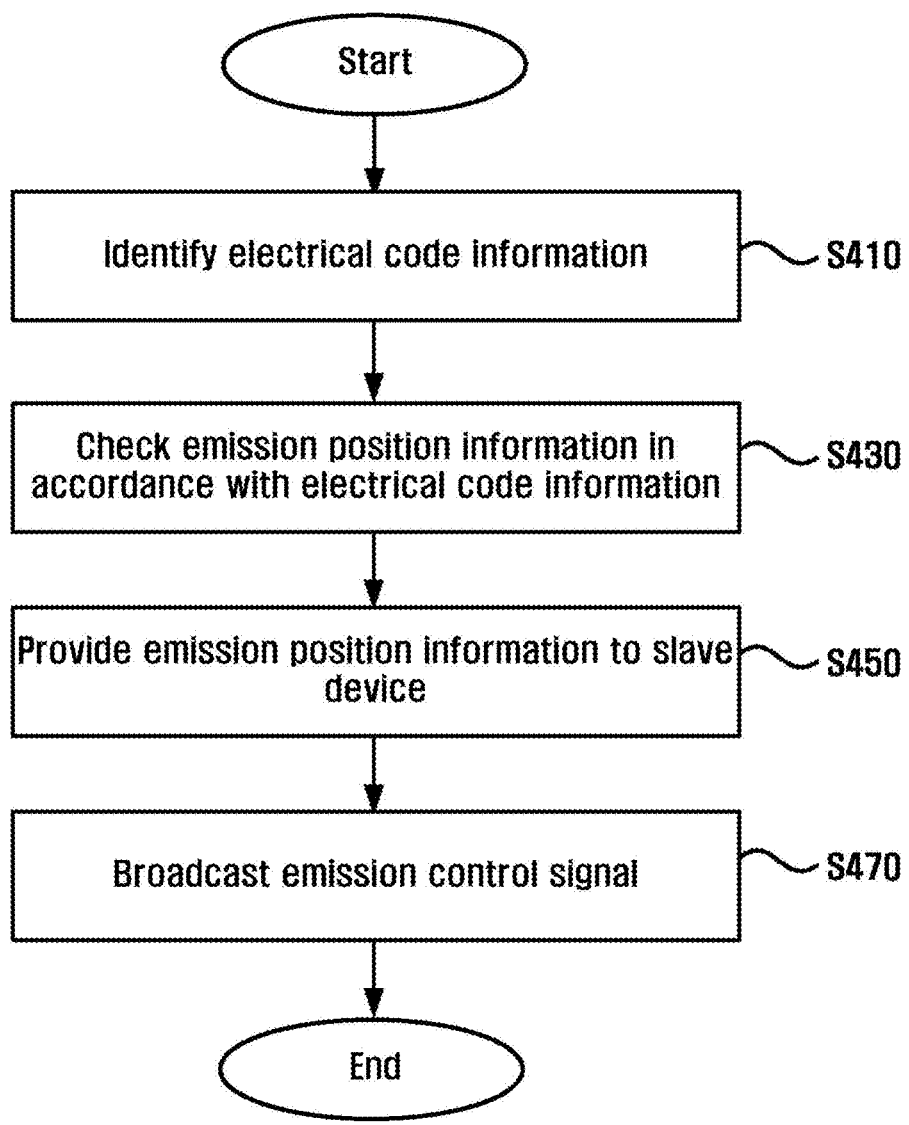
FIG. 4 is a flowchart showing an operation of controlling an emission of a slave device by a master device according to various exemplary embodiments of the inventive concept.

FIG. 4 is a flowchart showing an operation of controlling an emission of the slave device 200 by the master device 100 according to various exemplary embodiments of the inventive concept.

In operation S410, the master device 100 scans the electrical code printed on the ticket of audiences to identify the electrical code information. For instance, the user (e.g., administrator) of the master device 100 may scan the electrical code information printed on the ticket using the electrical code identification unit 120, e.g., optical scanner, and extract the electrical code information.

Then, in operation S430, the master device 100 may check the emission position information in accordance with the electrical code information. For instance, the master device 100 may check the emission position information mapped in the electrical code information on the storing unit 130 or the server.

In operation S450, the master device 100 may provide (e.g., insertion) the checked emission position information to the slave device 200. For instance, after the checking of the electrical code information and the providing of the emission position information, the administrator of the master device 100 may provide the slave device 200, into which the emission position information is inserted, to the audiences who brought the ticket. The audiences may confirm an assigned seat in the concert hall on the basis of the seat information and may sit in the corresponding seat.

In operation S470, the master device 100 may broadcast the emission control signal. For instance, the master device 100 may transmit the emission control signal to the slave devices 200 in accordance with a certain scenario of the show or the real time control. In this case, the master device 100 may continuously or periodically broadcast or transmit the same emission control signal to the slave devices 200 that are unspecified.

Figure 5:
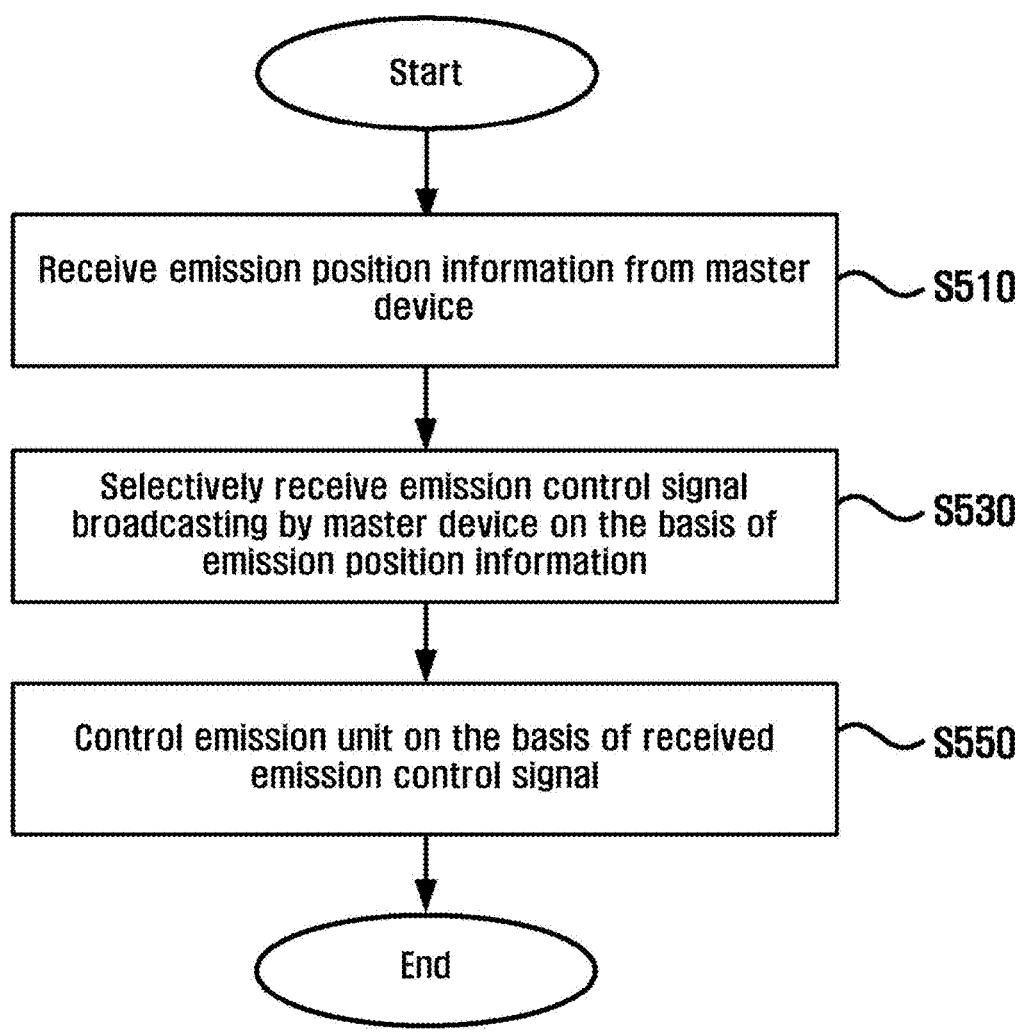
FIG. 5 is a flowchart showing an operation of an emission unit in a slave device under a control of a master device according to various exemplary embodiments of the inventive concept.

FIG. 5 is a flowchart showing an operation of the emission unit 220 in the slave device 200 under the control of the master device 100 according to various exemplary embodiments of the inventive concept.

In operation S510, the slave device 200 may receive the emission position information from the master device 100 and store the received emission position information in the storing unit 230.

In operation S530, the slave device 200 may selectively receive the emission control signal corresponding to the emission position information stored in the storing unit 230 among the emission control signals broadcasted by the master device 100. In addition, the slave device 200 may control the emission unit 220 on the basis of the received emission control signal to output the various emission patterns in operation S550.

Figure 6:
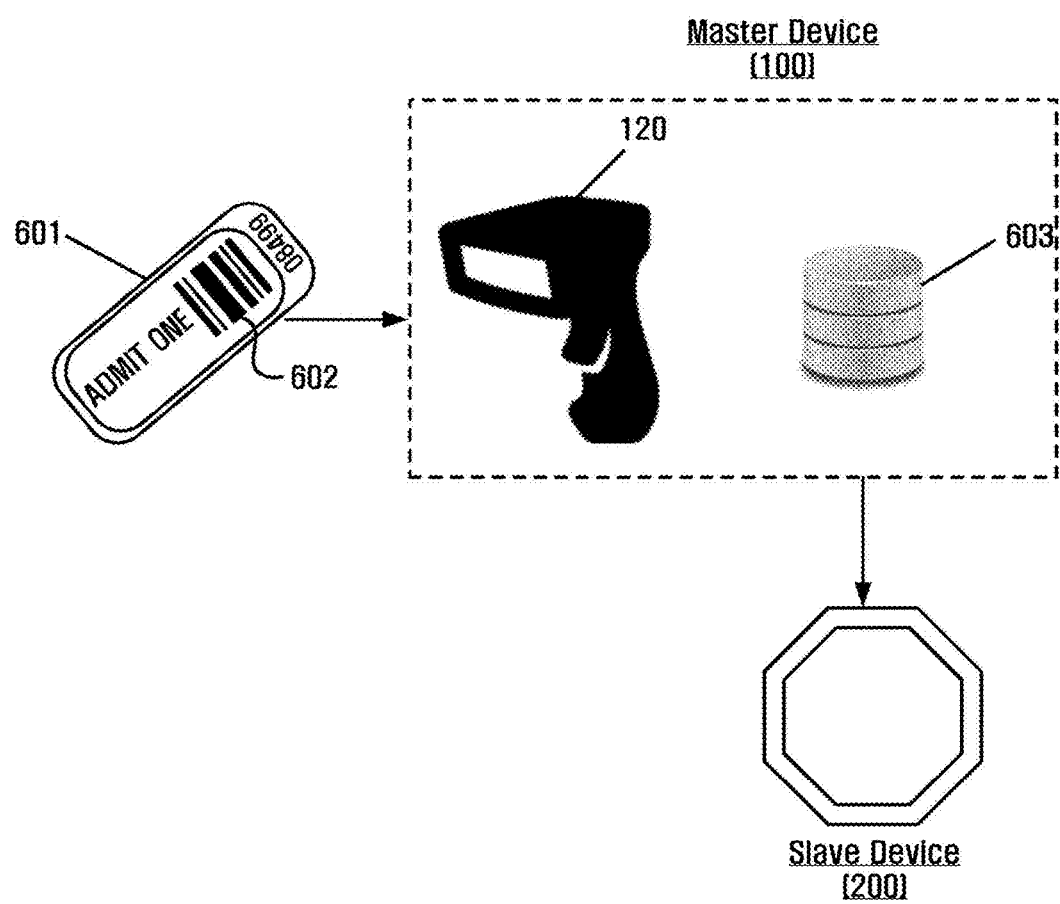
FIG. 6 is a view showing an operation of scanning electrical code information of a ticket in a master device and providing emission position information corresponding to the electrical code information to a slave device according to various exemplary embodiments of the inventive concept.

FIG. 6 is a view showing an operation of scanning electrical code information of the ticket in the master device 100 and providing the emission position information corresponding to the electrical code information to the slave device 100 according to various exemplary embodiments of the inventive concept.

As shown in FIG. 6, the master device 100 may scan the electric code 602 of the ticket 601 held in the audiences using the electrical code identification unit 120 to collect the electrical code information. In addition, in the case that the master device 100 is provided separately from the electrical code identification unit 120, the master device 100 may receive the electrical code information collected by the electrical code identification unit 120 through an intermediate medium, such as kiosk, a physical medium, such as an USB, or a network.

The master device 100 may check the emission position information corresponding to the collected electrical code information in the storing unit 130 or in a database (DB) 103 of the server 300 and may provide the checked emission position information to the slave device 200. In this case, the master device 100 may tag the slave device 200 through the information providing unit 150, such as an RF tag device, and thus the master device 100 may insert the emission position information into the slave device 200.

According to embodiments, the slave device 200 may allow the emission unit 220 to emit the light with the predetermined color when the slave device 200 receives the emission position information. Accordingly, it may be checked whether the information is successfully inserted into the slave device 200 by the emission control system 10 or the administrator of the master device 100.

Figure 7:
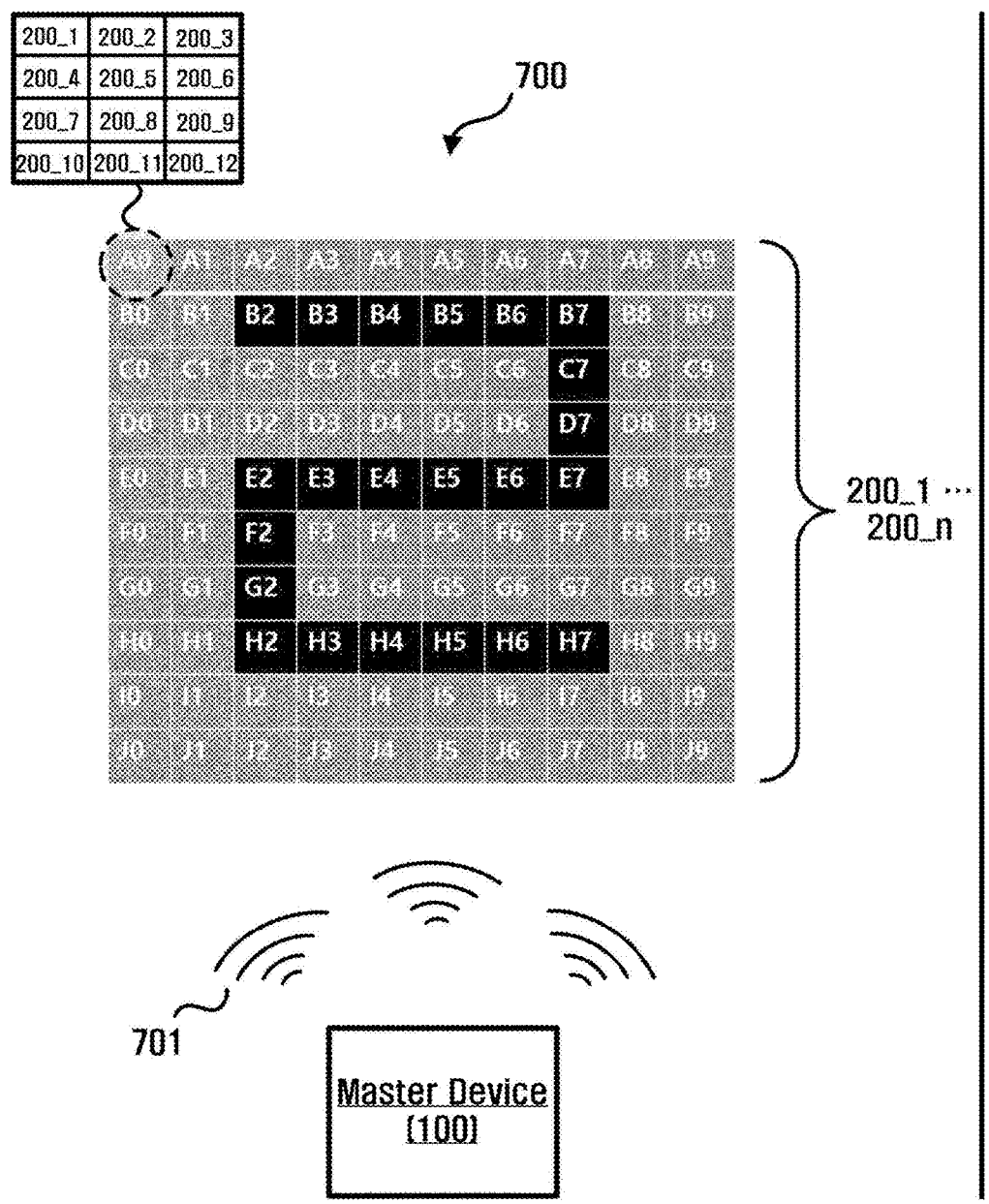
FIG. 7 is a view showing an operation of controlling an emission of slave devices in real time in a master device according to various exemplary embodiments of the inventive concept.

FIG. 7 is a view showing an operation of controlling the emission of slave devices 200 in real time by the master device 100 according to various exemplary embodiments of the inventive concept. FIG. 7 shows the slave device 200 into which the emission position information is inserted and the master device 100 controlling the slave device 200 in real time.

Referring to FIG. 7, an auditorium 700 in which a plurality of slave devices 200_1 to 200_*n* is disposed and the master device 100 are shown. The auditorium 700 includes groups of A0 to J9, and one group (e.g., A0) may include the slave devices 200_1 to 200-12 of the audiences sitting in seats. For instance, the A0 group may include twelve seats, and the emission position information of a first slave device 200_1 located at a first seat of the A0 group may be previously set as "A001". Similarly, the emission position information of a second slave device 200_2 located at a second seat of the A0 group may be previously set as "A002". However, the group classification method or the number of the slave devices 200 in each group should not be limited thereto or thereby.

The master device 100 may broadcast the emission control signal 701 to the slave devices 200_1 to 200_*n* after the show begins or during the show. The emission control signal 701 may be a signal directing the slave devices to output the number "2" when viewed as a whole as shown in FIG. 7. In detail, the slave devices 200_1 to 200_12 of the A0 group may receive the information (e.g., a blue LED emission signal) corresponding to the emission position information of the A0 group among the broadcasted emission control signals 701, and thus the slave device 200_1 to 200_12 of the A0 group may output the blue light. The slave devices of the B2 group may receive the information (e.g., a red LED emission signal) corresponding to the emission position information of the B2 group among the broadcasted emission control signals 701, and thus the slave device of the B2 group may output the red light.

Although not shown in FIG. 7, the emission shape or the emission pattern directed by the real time control may be controlled in a color book method in addition to the dot method. For instance, in the case that the auditorium 700 shown in FIG. 7 becomes larger, the master device 100 may primarily transmit group identification numbers to the slave devices 200 included in each group, and then the master device 100 may broadcast the emission control signal in associated with the color represented by each group to the slave devices 200 included in each group. Thus, various directing effects may be obtained by determining an outline of the directing pattern using the grouping method and by changing the emission pattern of each group in real time. However, the directing method according to various embodiment of the inventive concept should not be limited to the dot method or the color book method.

The emission control signal broadcasted by the master device 100 in FIG. 7 may include various types of data. For instance, the data may include a command, a scenario, and an emission pattern (e.g., emission presence, emission color, emission time, etc.) directed by each group. The administrator of the master device 100 may input the directing pattern, which is to be controlled, to the master device 100 in real time using various ways, and the master device 100 may broadcast the emission control signal 701 such that the input directing pattern is output.

As described above, the emission position information previously designated in accordance with the electrical cod information of the ticket are inserted into each slave device 200, and thus various emission patterns used in the concert hall may be effectively directed.

Figure 8:
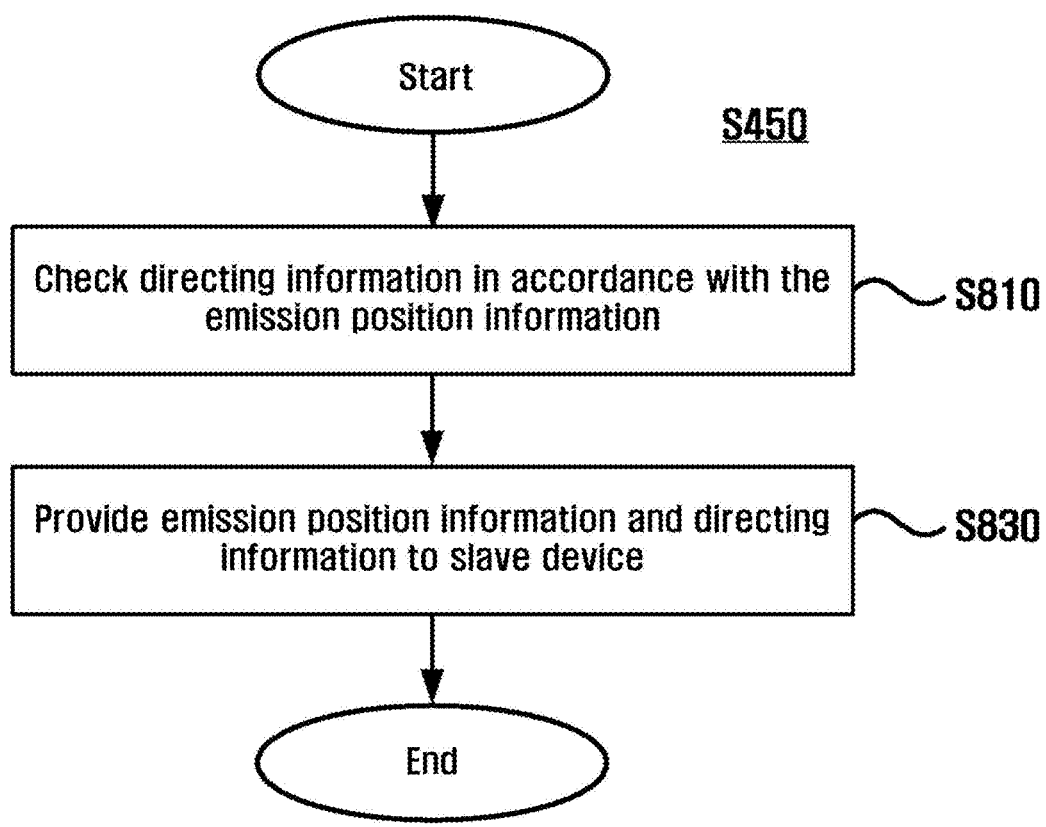
FIG. 8 is a flowchart showing an operation of providing directing information previously set in accordance with emission position information in a master device to a slave device according to various exemplary embodiments of the inventive concept.

FIG. 8 is a flowchart showing an operation of providing the directing information previously set in accordance with the emission position information in the master device 100 to the slave device 200 according to various exemplary embodiments of the inventive concept. Operations shown in FIG. 8 may be examples of operation S450 shown in FIG. 4.

According to various embodiments, in operation S810, the master device 100 may check the directing information previously set in accordance with the emission position information. For instance, when the master device 100 checks the emission position information corresponding to the electrical code information, the master device 100 may additionally or simultaneously check the directing information corresponding to the emission position information. The directing information may be data previously provided to the slave device 200 to direct the emission with high quality, and may be information controlling the slave device 200 such that the emission unit 220 of the slave device 200 emits the light by one or more sections that are previously determined.

In operation S830, the master device 100 may provide the emission position information and the directing information to the slave device 200. In this case, the emission position information and the directing information may be transmitted in a single data form, but they should not be limited thereto or thereby.

According to some embodiments, the master device 100 may provide a lock signal to the slave device 200 to drive the slave device 200 in a lock mode during a predetermined period. As an example, the lock mode indicates a state in which the emission unit or a power unit of the slave device 200 may not be operated. Accordingly, undesired noise emission pattern caused by operations of some slave devices 200 may be prevented from occurring during the emission directed in accordance with the scenario previously determined.

According to additional embodiments, in the case that the previously set conditions are satisfied, the master device 100 may control the slave device (e.g., a first slave device) to allow the slave device 200 to transmit the emission position information and the directing information thereof to another slave device (e.g., a second slave device) disposed adjacent to the slave device 200.

According to various embodiment, a first condition of the previously set conditions indicates a case in which the emission position information is not included in the second slave device. For instance, a case, in which the administrator of the mater device 100 does not insert the emission position information corresponding to the electrical code information into the slave device (e.g., the second slave device) after scanning the electrical code information from the ticket, may occur. In this case, when the mater device 100 broadcasts the emission control signal, the second slave device may transmit a response signal, which indicates that the second slave device may not identify the emission control signal corresponding to the emission position information included therein among the emission control signals, to the master device 100.

Meanwhile, a second condition of the previously set conditions may be set to allow the directing information of the second device to be the same as the directing information of the first slave device disposed adjacent to the second slave device. If the directing information transmitted to the second slave device are different from the directing information of the first slave device, the noise may be caused entirely when a specific emission pattern is directed.

Accordingly, in the case that the first condition is satisfied, the second slave device may search the slave devices disposed in the vicinity thereof and collect the emission position information of at least one slave device of the searched slave devices. The second slave device may transmit the collected emission position information to the master device 100, and the master device 100 may check whether the directing information corresponding to the corresponding emission position information is the same as the directing information provided to the second slave device in the storing unit 130 or the server 300 on the basis of the received emission position information. In the case that the directing information corresponding to the corresponding emission position information is the same as the directing information provided to the second slave device, the master device 100 may transmit the signal that controls the checked slave device (e.g., the first slave device) to transmit the emission position information and the directing information of the first slave device to the second slave device. As a result, the first slave device may transmit the emission position information and the directing information thereof to the second slave device.

Accordingly, although the show begins, information required to perform the direction may be indirectly provided to the slave device 200, and thus the planned emission pattern may be smoothly directed.

Figure 9:
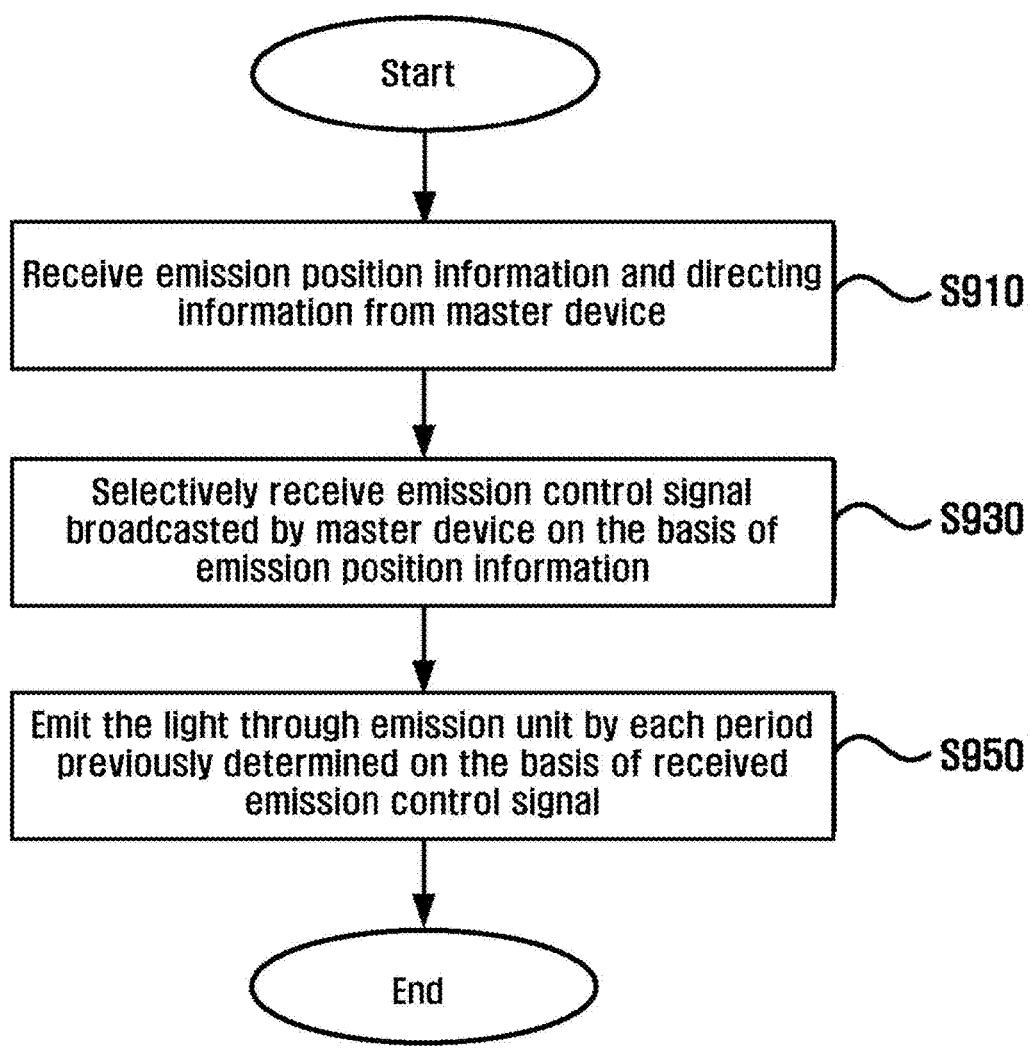
FIG. 9 is a flowchart showing an operation of controlling an emission unit in a slave device on the basis of directing information provided from a master device according to various exemplary embodiments of the inventive concept.

FIG. 9 is a flowchart showing an operation of controlling the emission unit 220 by the slave device 200 on the basis of the directing information provided from the master device 100 according to various exemplary embodiments of the inventive concept. In FIG. 9, detailed descriptions of the same operations as those shown in FIG. 5 will be omitted.

According to various embodiment, in operation S910, the slave device 200 may receive the emission position information and the directing information from the master device 100. In this case, the slave device 200 may store the received emission position information and the directing information into the storing unit 230.

In operation S930, the slave device 200 may selectively receive the emission control signal broadcasted by the master device 100 on the basis of the emission position information.

According to various embodiments, in operation S950, the slave device 200 may emit the light through the emission unit by periods previously determined on the basis of the received emission control signal.

For instance, the slave device 200 may operate the emission unit 220 on the basis of first directing information during a first period (e.g., a first time) and operate the emission unit 220 on the basis of second directing information during a second period (e.g., a second time). The slave device 200 may automatically operate the emission unit 220 in response to the directing information determined depending on the periods or may operate the emission unit 220 by selectively receiving an activation signal, which is broadcasted by the master device 100, by each period.

Figure 10:
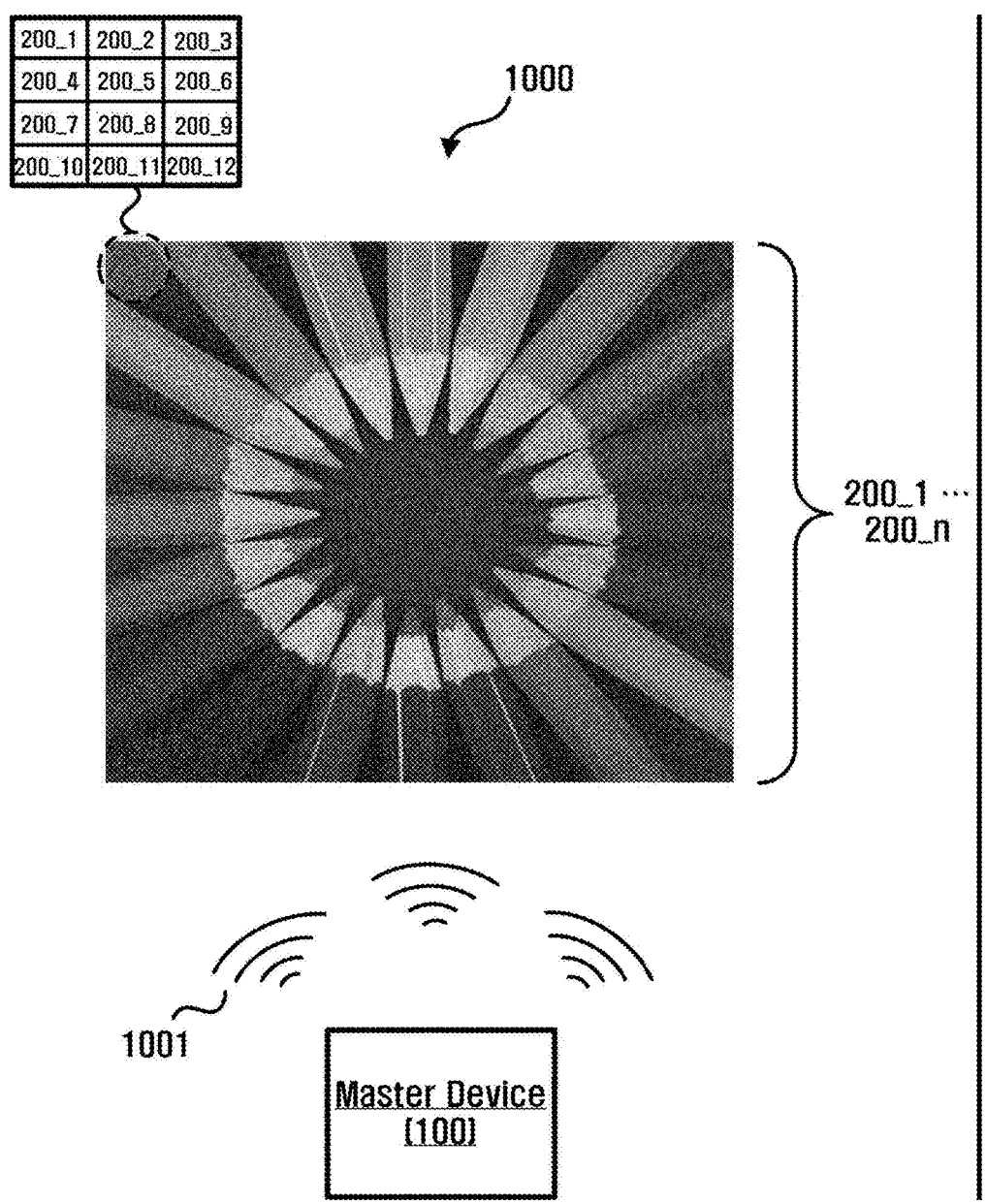
FIG. 10 is a view showing an operation of allowing a slave device to emit a light in accordance with directing information previously set in a master device according to various exemplary embodiments of the inventive concept.

FIG. 10 is a view showing an operation of allowing the slave device 200 to emit the light in accordance with the directing information previously set in the master device 100 according to various exemplary embodiments of the inventive concept. In FIG. 10, detailed descriptions of the same features as those in FIG. 7 will be omitted.

Different from FIG. 7, the emission pattern having relatively high quality is directed in an auditorium 1000. To this end, the emission position information and the directing information may be previously stored in each slave device 200. In addition, each slave device 200 may include information on which scenario is directed among previously set scenarios, information required to select an image processing function, such as a dissolve technique, a fade technique, etc., or information about a function of setting a duration of the emission pattern.

According to various embodiment, the slave device 200 may store the data and direct a previously-set emission pattern (e.g., specific pixel data) in response to the emission control signal (e.g., a flag signal) broadcasted by the master device 100. As described above, when the data are previously stored in the slave device 200, the emission pattern having the high quality may be rapidly and precisely directed.

In addition, various emission patterns for the cheering tool (slave) may be generated by directing the emission pattern having the high quality in athletics or concerts, and the cheering effect caused by the various emission patterns may be improved.

In the above-mentioned descriptions, the function of the emission control system 10 using the electrical code information has been described. Hereinafter, a function of an emission control system 10 using the control of the radio wave intensity will be described. However, the emission control system 10 shown in FIGS. 1 to 10 and the emission control system 10 shown in FIGS. 11 to 18 are not limited to be operated independently, and the emission control system 10 shown in FIGS. 1 to 10 and the emission control system 10 shown in FIGS. 11 to 18 may be configured to further include configurations and functions of each other.

Figure 11:
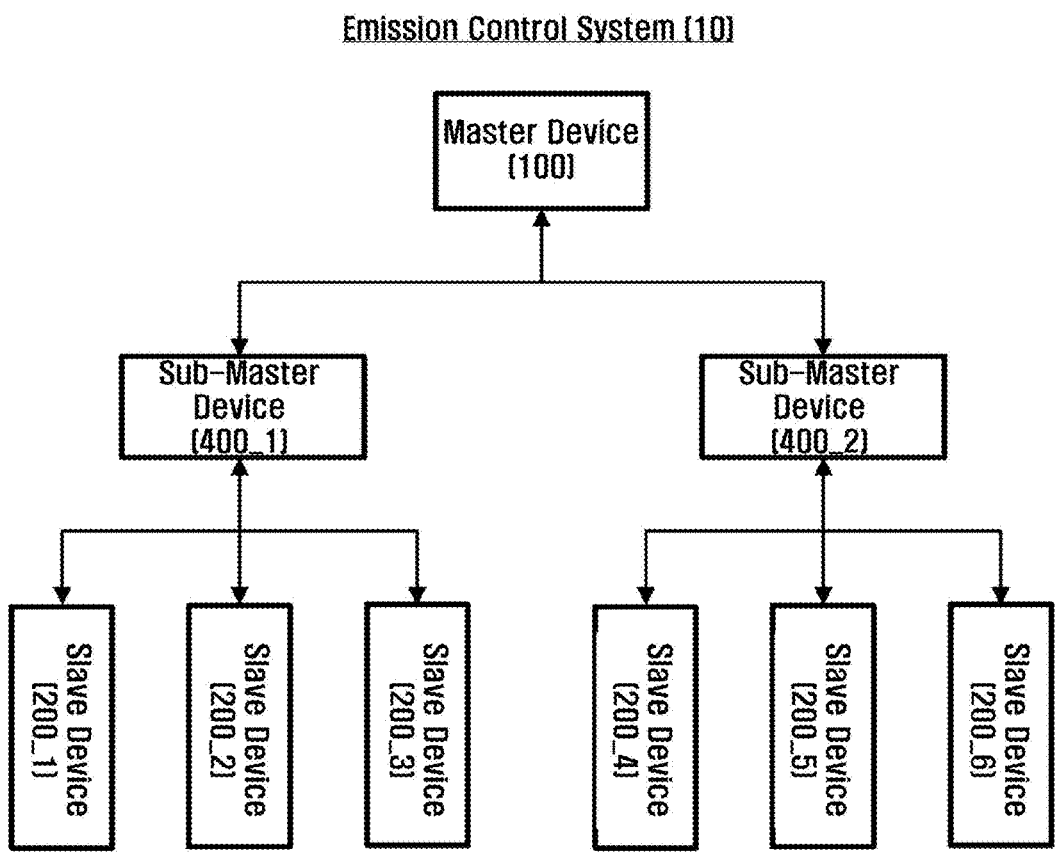
FIG. 11 is a block diagram showing an emission control system according to another exemplary embodiment of the inventive concept.

FIG. 11 is a block diagram showing the emission control system 10 according to another exemplary embodiment of the inventive concept. In the present exemplary embodiment, different features of the emission control system 10 shown in FIG. 11 from those of the emission control system 10 shown in FIG. 1 will be mainly described. Accordingly, in FIG. 11, detailed descriptions of the same elements as those in FIG. 1 will be omitted or briefly described.

The emission control system 10 may include a master device 100, one or more sub-master devices 400, and one or more slave devices 200. The emission control system 10 may control the radio wave intensity of the sub-master devices 400 by using the master device 100, and thus the emission pattern of the slave devices 200 may be controlled.

Although not shown in FIG. 11, the emission control system 10 may further include an external device (e.g., the server 300). Accordingly, at least a component (e.g., the master device) of the emission control system 10 may communicate with the external device to transmit/receive information required to direct the emission pattern to/from the external device.

According to various embodiments, the master device 100 may control the emission of the slave devices 200 through the sub-master devices 400.

The sub-master devices 400 may periodically control the radio wave intensity or control the radio wave intensity by a predetermined interval, and thus the emission of the slave devices 200 may be controlled. As an example, the sub-master devices 400 may be electronic devices fixedly provided at predetermined positions, but they should not be limited thereto or thereby.

According to various embodiments, the slave devices 200 may perform a function of directing various types of emission pattern in real time or by a predetermined interval under the control of the master device 100 or the sub-master devices 400.

The master device 100, the sub-master devices 400, and the slave devices 200 may communicate with each other in various ways. As an example, the master device 100 and the salve devices 200 may be connected to each other in a wireless communication network, e.g., an RF communication, an electric tag, etc., and the master device 100 and the sub-master devices 400 may be connected to each other in a telecommunication network, but they should not be limited thereto or thereby. In addition, the sub-master devices 400 and the slave devices 200 may be connected to each other in a telecommunication network, but they should not be limited thereto or thereby.

According to various embodiments, the communication unit 110 of the master device 100 may provide a communication between the master device 100 and the slave devices 200, between the master device 100 and the server 300, or between the master device 100 and the sub-master device 400.

In addition, the emission position information stored in the storing unit 130 of the master device 100 may be information that are previously set to identify or group the slave devices 200 for the directing of the show in the master device 100 or the sub-master device 400.

In addition, the emission control unit 160 of the master device 100 may transmit the emission control signal to the sub-master devices 400 or the slave devices 200.

According to various embodiments, the emission control unit 160 of the master device 100 may check the emission position information of the slave devices 200 and may broadcast or transmit a first emission control signal to the sub-master device 400 to control the radio wave intensity of an antenna module 215 (refer to FIG. 12) of the sub-master device 400, thereby controlling the emission pattern of the slave devices 200. The first emission control signal may be used to allow the master device 100 to control the sub-master device 400 and may include ID information corresponding to each sub-master device 400 such that the sub-master devices 400 selectively receive the first emission control signal.

According to various embodiments, the first emission control signal may include a radio wave intensity value and an emission pattern value of the sub-master devices 400. The radio wave intensity value may indicate a specific radio wave intensity, and a control radius corresponding to a predetermined radius with respect to the sub-master device 400 may be set in accordance with the radio wave intensity value. In addition, the emission pattern value may be specific values required to control an emission timing, an emission color, and an emission duration of the slave device 200 disposed in the control radius. The emission timing indicates a time point at which the slave device 200 disposed in the control radius begins to emit the light. For instance, the emission pattern value may be an emission timing value, an emission color value, or an emission duration.

The above-mentioned first emission control signal will be described in detail with reference to FIGS. 14 to 17.

According to additional embodiments, the emission control unit 160 may broadcast a second emission control signal corresponding to the emission position information of each slave device 200 in a wireless channel to directly control the slave devices 200. For instance, the emission control unit 160 may broadcast the second emission control signal to the slave devices 200, and each slave device 200 may selectively receive the second emission control signal corresponding to its emission position information among the second emission control signals broadcasted by the emission control unit 160.

The communication unit 210 of the slave device 200 according to the embodiment shown in FIG. 11 may provide a communication between the slave devices 200 and the master device 100 or between the slave devices 200 and the sub-master device 400.

The emission control unit 250 of the slave device 200 according to the embodiment shown in FIG. 11 may receive the emission pattern information broadcasted by the sub-master device 400 or provided from the sub-master device and may control the emission unit 220 in response to the emission pattern information. In addition, the emission control unit 250 may selectively receive the emission control signal corresponding to the emission position information of the storing unit 230 among the emission control signals (e.g., the second emission control signals) broadcasted by the master device 100 and may control the emission unit 220 on the basis of the received emission control signal.

Figure 12:
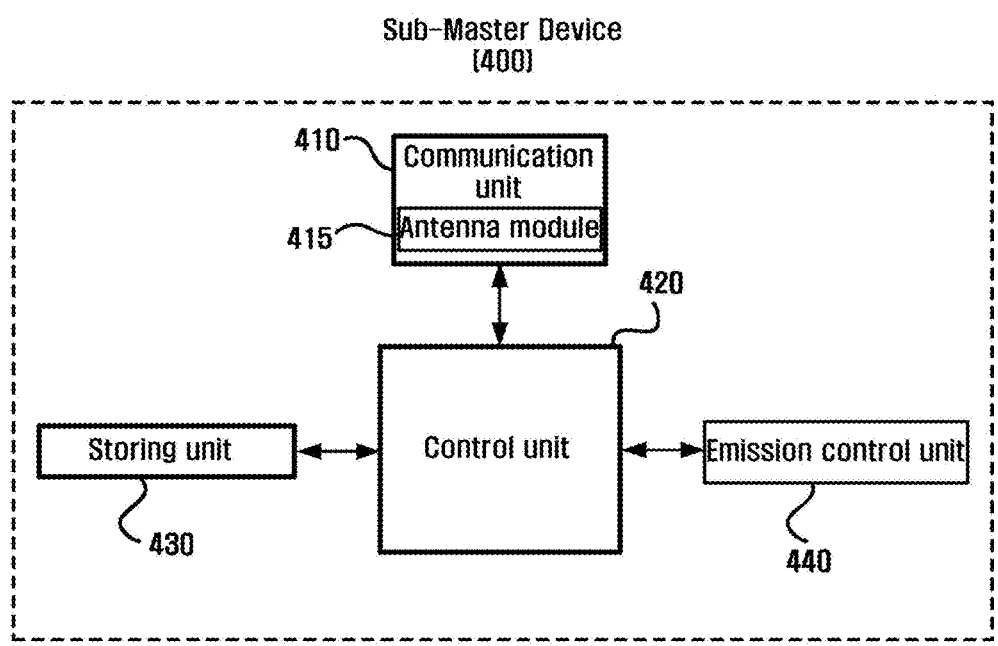
FIG. 12 is a block diagram showing a sub-master device according to various exemplary embodiments of the inventive concept.

FIG. 12 is a block diagram showing the sub-master device 400 according to various exemplary embodiments of the inventive concept.

The sub-master device 400 may include a communication unit 410, a control unit 420, a storing unit 430, and an emission control unit 440. According to various embodiments, the sub-master device 400 may further include additional units, e.g., an input module, a display module, a power module, an audio module, etc., or some units of the sub-master device 400 shown in FIG. 12 may be omitted.

The communication unit 410 may provide a communication between the sub-master device 400 and the master device 100 or between the sub-master device 400 and the slave device 200. The communication unit 410 may include, for example, at least one of a wired communication module (e.g., a connector, a connector module, etc.) and a wireless communication module (e.g., an RF transceiver, a Zigbee module, a Bluetooth, a WIFI module, etc.).

According to various embodiments, the communication unit 410 may include the antenna module 415. The antenna module 415 may include at least one antenna and have a configuration to control the radio wave intensity in proportion to a current applied there to or a level of a voltage. For instance, in a case that the radio wave intensity is received from the mater device 100, the communication unit 410 or the antenna module 415 of the sub-master device 400 may control the intensity of the radio wave under the control of the control unit 420 or the emission control unit 440, and thus the control radius required to control the slave device 200 may be set/changed.

The control unit 420 may perform a data processing function to control an overall operation, e.g., a control of power supply, of the sub-master device 400 and a signal flow between components in the sub-master device 400. The control unit 420 may include at least one processor.

The storing unit 430 may store data provided from or generated by other components of the control unit 420, the sub-master device 400, or the emission control system 10. The storing unit 430 may include, for example, a memory, a cash, a buffer, etc.

According to various embodiments, the storing unit 430 may store the radio wave intensity value and the emission pattern value, which are provided from the master device 100. In addition, the storing unit 430 may store the ID information corresponding to the sub-master device 400 to selectively receive the emission control signal broadcasted by the master device 100.

The emission control unit 440 may control the radio wave intensity of the antenna module 415 on the basis of the emission control signal provided from the master device 100 and control the emission pattern of the slave device 200 in the control radius set in accordance with the control of the radio wave intensity. The emission control unit 440 will be described in detail with reference to accompanying drawings.

Figure 13:
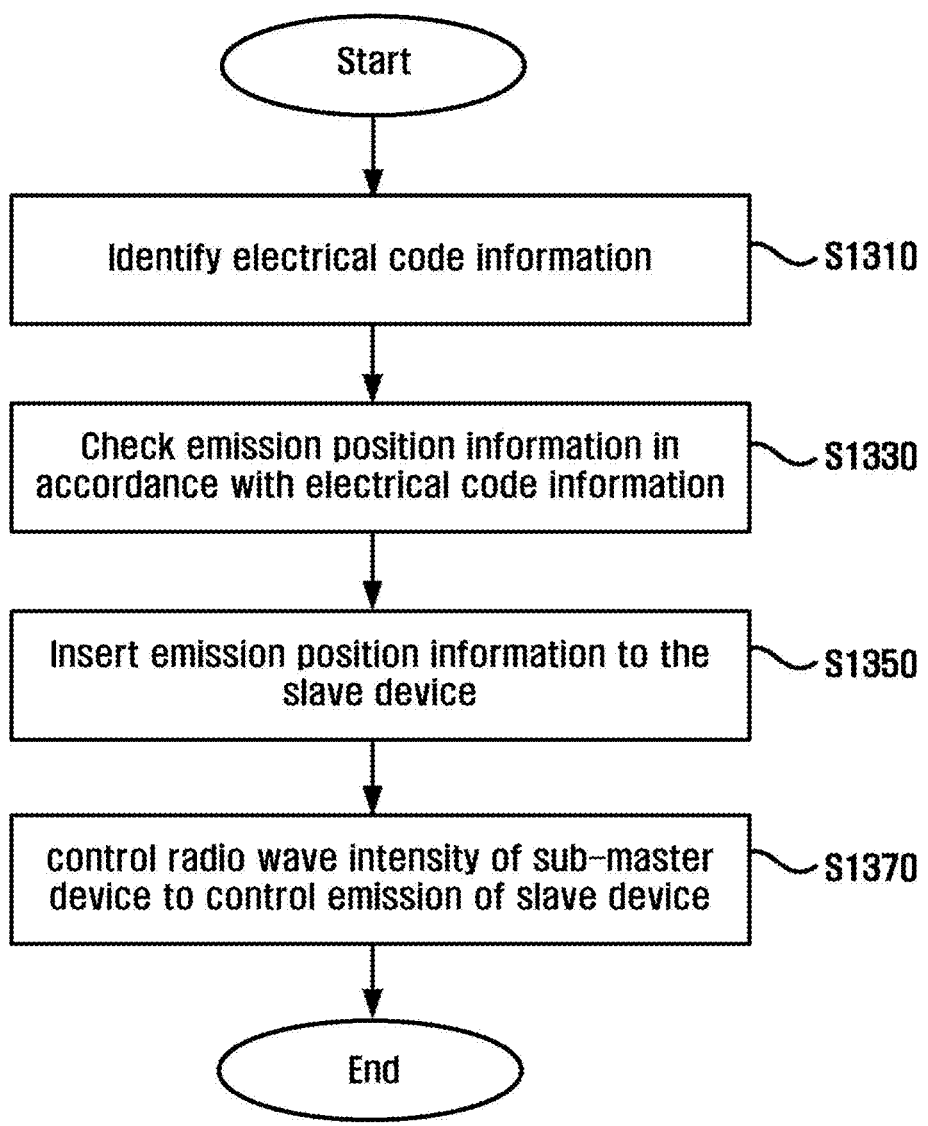
FIG. 13 is a flowchart showing an operation of controlling an emission of a slave device by controlling a radio wave intensity of a sub-master device in a master device according to various exemplary embodiments of the inventive concept.

FIG. 13 is a flowchart showing an operation of controlling the emission of the slave device 200 by controlling the radio wave intensity of the sub-master device 400 in the master device 100 according to various exemplary embodiments of the inventive concept.

In operation S1310, the master device 100 may scan the electrical code printed on the ticket of audiences to identify the electrical code information. For instance, the user (e.g., administrator) of the master device 100 may scan the electrical code information printed on the ticket using the electrical code identification unit 120, e.g., an optical scanner, and extract the electrical code information.

Then, in operation S1330, the master device 100 may check the emission position information in accordance with the electrical code information. For instance, the master device 100 may check the emission position information mapped in the electrical code information on the storing unit 130 or the server 300.

In operation S1350, the master device 100 may provide (e.g., insertion) the checked emission position information to the slave device 200. For instance, after the checking of the electrical code information and the providing of the emission position information, the administrator of the master device 100 may provide the slave device 200, into which the emission position information is inserted, to the audiences who brought the ticket. The audiences may confirm an assigned seat in the concert hall on the basis of the seat information and may sit in the corresponding seat.

In operation S1370, the master device 100 may control the radio wave intensity of the sub-master device 400 to control the emission pattern of the slave device 200. In this case, one or more sub-master devices 400 may be fixedly located at positions arranged at regular intervals in a concert hall or a sport arena. In addition, the slave devices 200 may be held by the user in the seat adjacent to the sub-master device 400 or may move along the user's movement.

The master device 100 may broadcast the emission control signal (e.g., the first emission control signal). For instance, the master device 100 may transmit the emission control signal to the sub-master devices 400 in accordance with a certain scenario of the show or the real time control. In this case, the master device 100 may continuously or periodically broadcast or transmit the same emission control signal to the sub-master devices 400 that are unspecified.

Figure 14:
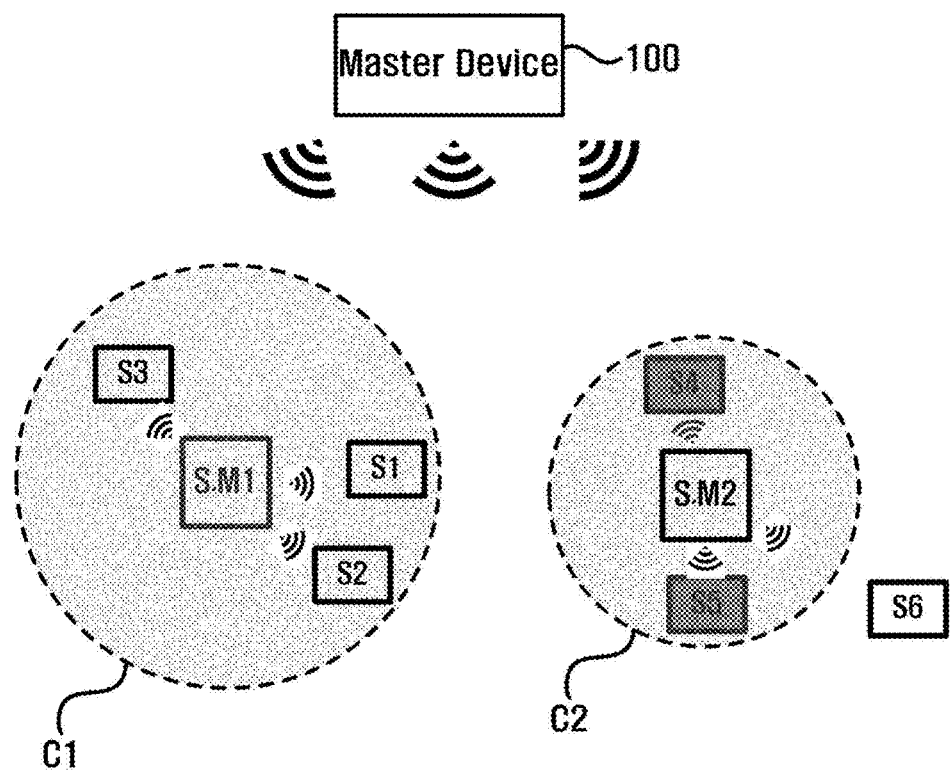
FIG. 14 is a view showing an operation of an emission control system according to various exemplary embodiments of the inventive concept.

FIG. 14 is a view showing an operation of an emission control system 10 according to various exemplary embodiments of the inventive concept.

As shown in FIG. 14, the master device 100 may transmit the emission control signal mapped in accordance with the ID information of each sub-master device to a first sub-master device S.M1 and a second sub-master device S.M2. In this case, the emission control signal may include a first radio wave intensity value allowing the first sub-master device S.M1 to set a first control radius C1 and a first emission pattern value allowing first, second, and third slave devices S1, S2, and S3 disposed in the first control radius C1 to emit the light having a red color.

In addition, the emission control signal may include a second radio wave intensity value allowing the second sub-master device S.M2 to set a second control radius C2 and a second emission pattern value allowing fourth and fifth slave devices S4 and S5 disposed in the second control radius C2 to emit the light having a blue color. In this case, since a sixth slave device S6 does not belong to any of the first control radius C1 and the second control radius C2, the sixth slave device S6 is maintained in an OFF state.

According to various embodiments, the master device 100 may output the emission control signal at an arbitrary time point or a predetermined period to change the first control radius C1 and the second control radius C2. For instance, although not shown in figures, when the master device 100 outputs the emission control signal such that the second control radius C2 increases and the sixth slave device S6 is disposed in the second control radius C2, the sixth slave device S6 may emit the light having the blue color.

Figure 15:
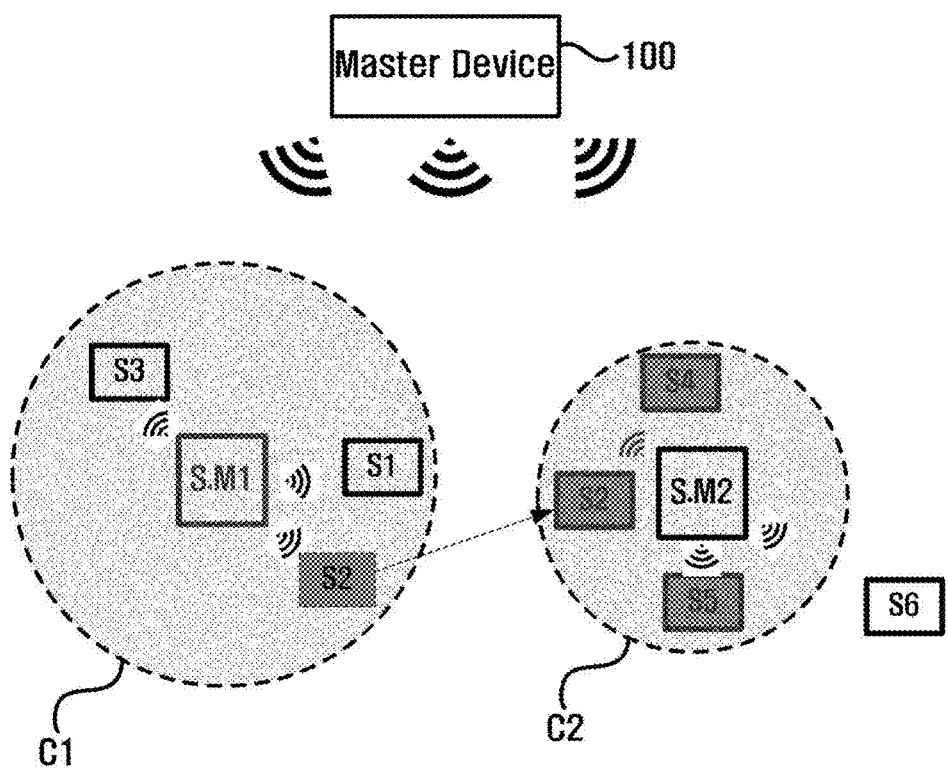
FIG. 15 is a view showing a variation in an emission pattern in accordance with a movement of a slave device in an emission control system according to various exemplary embodiments of the inventive concept.
Figure 16:
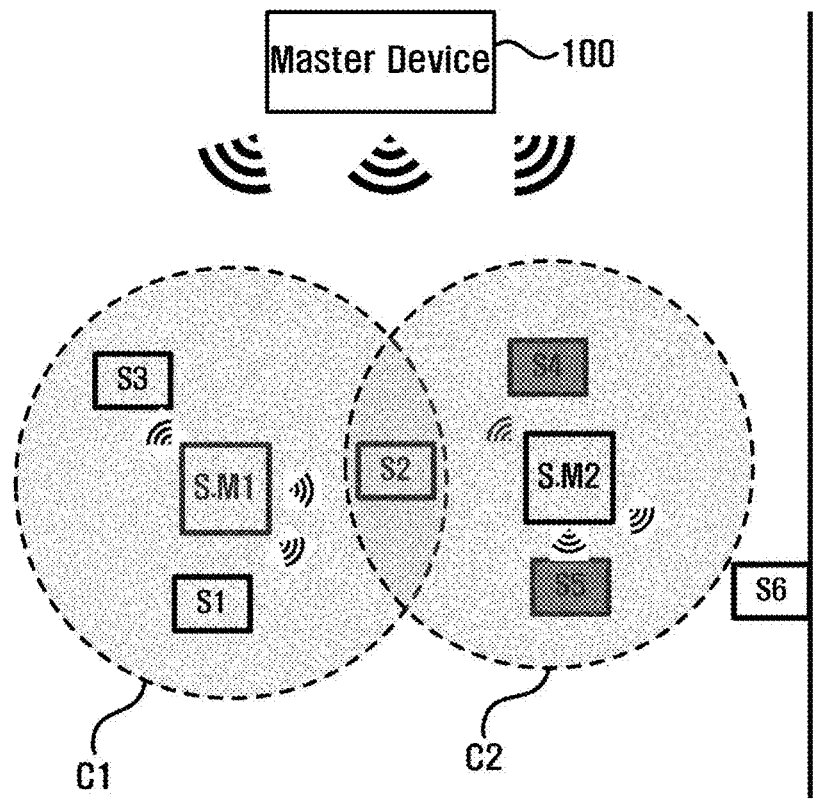
FIG. 16 is a view showing a variation in an emission pattern when a slave device is located at a position in a plurality of control radii in an emission control system according to various exemplary embodiments of the inventive concept.

FIG. 15 is a view showing a variation in an emission pattern in accordance with a movement of a slave device 200 in an emission control system 10 according to various exemplary embodiments of the inventive concept, and FIG. 16 is a view showing a variation in an emission pattern when a slave device 200 is located at positions in a plurality of control radii in an emission control system 10 according to various exemplary embodiments of the inventive concept.

Referring to FIG. 15, in a case that the second slave device 200 moves to the second control radius C2 from the first control radius C1, the second slave device 200 is operated under the control of the second sub-master device S.M2 without being controlled by the first sub-master device S.M1. Accordingly, the second slave device S2 emits the light having the blue color instead of the light having the red color.

In addition, referring to FIG. 16, the second slave device S2 may be disposed in both of the first control radius C1 and the second control radius C2 due to the movement of the user of the second slave device S2. In this case, the second slave device S2 may emit the light having an average value of the first emission pattern value and the second emission pattern value.

For instance, in a case that the emission unit 220 of the second slave device S2 has a structure in which the LEDs are stacked one on another in a depth direction, some LEDs of the LEDs emit the blue light and the other LEDs of the LEDs emit the red light on the basis of the first and second emission pattern values. In this case, the second slave device 200 may be perceived as a purple color when viewed in a top view. However, the second slave device S2 may emit the light in various ways on the basis of the first and second emission pattern values in accordance with the configurations of the emission unit 220 or an emission plan.

According to the above-mentioned embodiments, the emission control system 10 may control the slave devices 200 using the sub-master devices 400, and thus the emission control system 10 may effectively control the slave devices 200.

Figure 17:
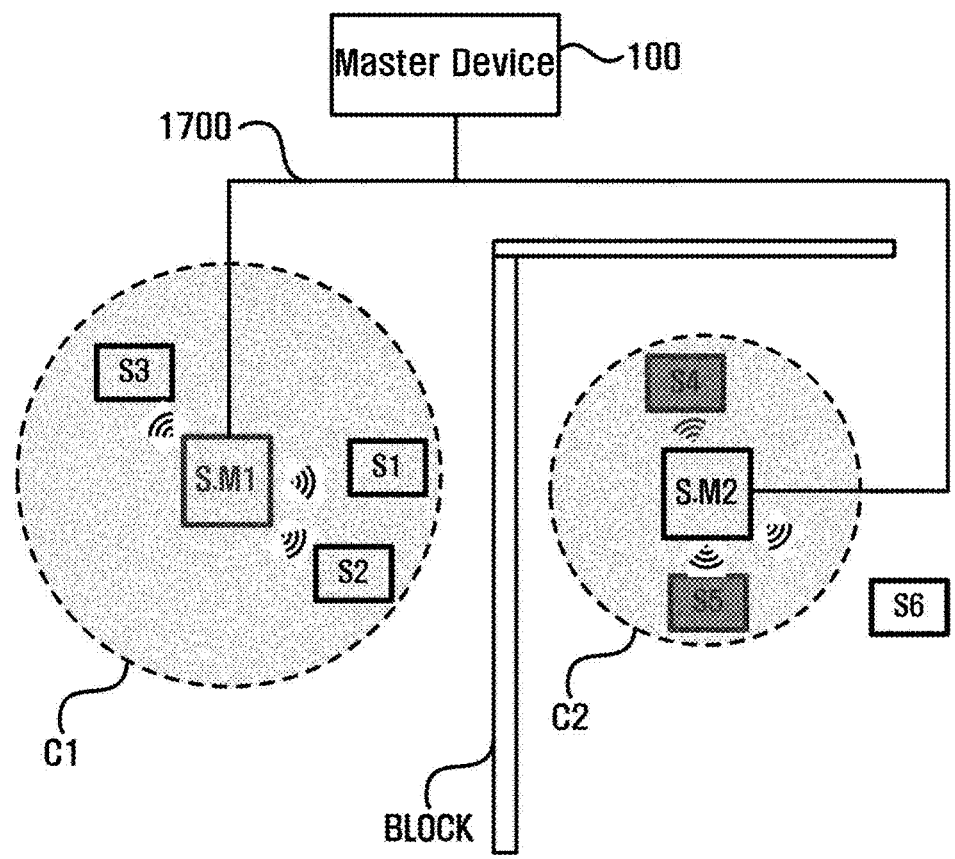
FIG. 17 is a view showing a structure in which a master device is wire-connected to each sub-master device in an emission control system according to various exemplary embodiments of the inventive concept.

FIG. 17 is a view showing a structure in which the master device 100 is wire-connected to each sub-master device 400 in the emission control system 10 according to various exemplary embodiments of the inventive concept. This structure shown in FIG. 17 is to prevent a phenomenon, in which the emission control signal is not applied to the sub-master device 400, from occurring when an obstacle, such as a block, is located between the master device 100 and the sub-master device 400.

As shown in FIG. 17, the master device 100 may be connected to the first sub-master device S.M1 and the second sub-master device S.M2 by a wired cable 1700. The master device 100 may transmit the emission control signal to each of the first and second sub-master devices S.M1 and S.M2 in a wired transmission mode. Accordingly, the master device 100 may stably transmit the emission control signal to the second sub-master device S.M2 surrounded by the block.

Figure 18:
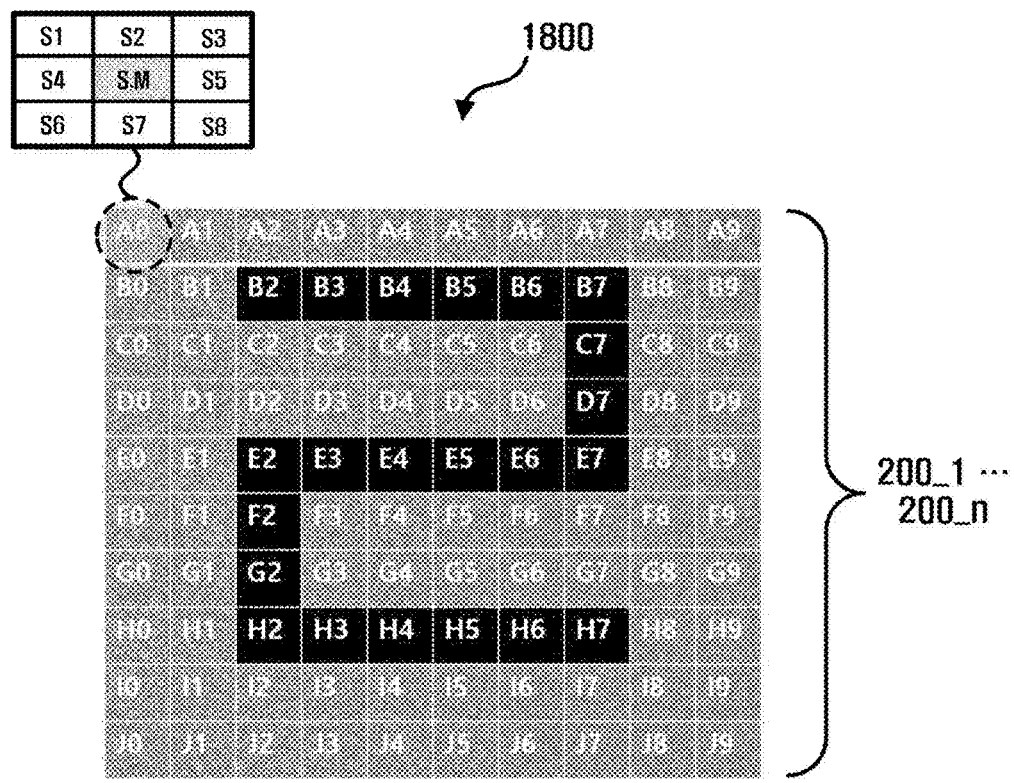
FIG. 18 is a view showing a directing screen in accordance with an operation of an emission control system according to various exemplary embodiments of the inventive concept.

FIG. 18 is a view showing a directing screen in accordance with an operation of the emission control system 10 according to various exemplary embodiments of the inventive concept.

Referring to FIG. 18, an auditorium 1800, in which a plurality of sub-slave devices 200_1 to 200_n, one or more sub-master devices 400 controlling the sub-slave devices 200_1 to 200_n, the master device 100 transmitting the emission control signal to the sub-master device 400 are disposed, is shown. The auditorium 1800 includes groups of A0 to J9, and one group (e.g., A0) may include the slave devices (e.g., S1 to S8) of the audiences sitting in seats and the sub-master device (e.g., S.M) controlling the emission of the slave devices (e.g., S1 to S8). For the convenience of explanation, the slave devices (e.g., S1 to S8) and the sub-master device (e.g., S.M) are located at predetermined positions in the A0 group, but they should not be limited thereto or thereby. That is, the slave devices (e.g., S1 to S8) and the sub-master device (e.g., S.M) may be arranged in the forms shown in FIGS. 14 to 17.

The master device 100 may broadcast the emission control signal 1801 to the sub-master device 400 after the show begins or during the show. The emission control signal 1801 may be a signal controlling the emission pattern of the slave devices 200 belonging to each control radius generated by controlling the radio wave intensity of each sub-master device 400. For instance, the emission control signal 1801 may be a signal directing the slave devices to output the number "2" when viewed as a whole as shown in FIG. 18. As described above, the directed screen may be represented by controlling the radio wave intensity of the sub-master device S.M, but the directed screen may be directed by the master device 100 that directly controls the slave device 200. For instance, the master device 100 may broadcast the emission position information of the slave device 200 and the directing information or the emission pattern value corresponding to the emission position information, and thus the master device 100 may directly control the emission of the slave device 200. In this case, the slave device 200 may selectively receive the information corresponding to its emission position information among the information broadcasted by the master device 100, and thus the emission unit 220 may be controlled.

The slave devices 200 may be effectively controlled after being grouped through the embodiments described with reference to FIGS. 11 to 18, and the emission control system 10 may effectively control the slave devices 200 that move in real time.

The term "module" or "~ section" used herein may represent, for example, a unit including one or more combinations of hardware, software and firmware. The term "module" or "~ section" may be interchangeably used with the terms "unit", "logic", "logical block", "component" and "circuit". The "module" or "~ section" may be a minimum unit of an integrated component or may be a part thereof. The "module" or "~ section" may be a minimum unit for performing one or more functions or a part thereof. The "module" or "~ section" may be implemented mechanically or electronically.

A module or a programming module according to an embodiment of the inventive concept may include at least one of the above elements, or a portion of the above elements may be omitted, or additional other elements may be further included. Operations performed by a module, a programming module, or other elements according to an embodiment of the inventive concept may be executed sequentially, in parallel, repeatedly, or in a heuristic method. Also, a portion of operations may be executed in different sequences, omitted, or other operations may be added.

What is claimed is:

1. A master device controlling a plurality of slave devices, comprising:
   a communication unit; and
   an emission control unit configured to broadcast a emission control signal corresponding to emission position information indicating specific positions at which the plurality of slave devices emit lights, through the communication unit,
   wherein
      the emission position information includes information previously set to group the plurality of slave devices, and
      when emission position information of a first plurality of slave devices among the plurality of slave devices are set previously to group as A0 group and emission position information of a second plurality of slave devices among the plurality of slave devices are set previously to group as B0 group, the emission control unit broadcasts the emission control signal including a first emission control signal corresponding to the emission position information of the A0 group and a second emission control signal corresponding to the emission position information of the B0 group.

2. The master device of claim 1, further comprising:
   an electrical code identification unit configured to identify electrical code information previously output;
   an information check unit configured to check emission position information previously set in accordance with the identified electrical code information and indicating the specific positions at which the plurality of slave devices emit the lights; and
   an information providing unit configured to provide the checked emission position information to a first slave device among the plurality of slave devices,
   wherein
      the information check unit further checks directing information to allow the first slave device to emit a light in a pattern previously set in accordance with the emission position information, and
      the information providing unit further provides the directing information to the first slave device.

3. The master device of claim 2, wherein the directing information is information to control the first slave device such that an emission unit of the first slave device emits the light by one or more predetermined periods, and the directing information is activated when the first slave device receives the emission control signal.

4. The master device of claim 3, wherein the emission control unit transmits a lock signal to the slave devices to drive the first slave device in a lock mode during the predetermined period.

5. The master device of claim 2, wherein, when a previously-set condition is satisfied, the information providing unit transmits the emission position information of the first slave device, the directing information of the first slave device, and a control signal to the first slave device, and the control signal allows the emission position information and the directing information of the first slave device to be transmitted to a second slave device disposed adjacent to the first slave device.

6. A slave device controlled by a master device, comprising:
   a communication unit;
   an emission unit configured to include at least one light source device;
   an information receiving unit configured to receive emission position information corresponding to previously-set electrical code information from the master device; and
   an emission control unit selectively configured to receive an emission control signal corresponding to the emission position information at a position corresponding to the emission position information among emission control signals broadcasted by the master device and control the emission unit on the basis of the received emission control signal,
   wherein
      the emission position information includes information previously set to group a plurality of slave devices, and
      when the emission position information of the slave device includes information previously set to group the slave device as A0 group, the emission control unit selectively receives a first emission control signal corresponding to the emission position information of the A0 group among the emission control signals and controls the emission unit based on the first emission control signal.

7. The slave device of claim 6, wherein the information receiving unit further receives directing information to allow the slave device to emit a light in a pattern previously set in accordance with the emission position information, and the emission control unit controls the emission unit such that the emission unit emits the light by one or more predetermined periods based on the received emission control signal.

8. The slave device of claim 7, wherein the emission control unit operates the slave device in a lock mode during the predetermined period when the emission control unit receives a lock signal from the master device.

9. The slave device of claim 7, wherein, when a previously-set condition is satisfied, the emission control unit controls the communication unit to transmit the emission position information to another slave device disposed adjacent to the slave device.

10. The slave device of claim 6, wherein the emission control unit allows the emission unit to emit the light having a predetermined color when the emission position information is completely received.

11. The slave device of claim 6, wherein the slave device outputs an emission pattern in conjunction with a user terminal of a user by transmitting the received emission control signal to the user terminal or emits the light in response to a control signal input thereto through the user terminal.

12. A master device controlling a plurality of slave devices through at least one sub-master device, comprising:
   a communication unit; and
   an emission control unit configured to provide an emission control signal to a first sub-master device through the communication unit so as to selectively control emission of a first slave device by controlling a radio wave intensity of the first sub-master device located at a position spaced apart from a first emission position of the first slave device among the plurality of slave devices,
   wherein the emission control signal includes a first emission pattern value to allow a first plurality of slave devices located in a first control radius set in accordance with the radio wave intensity of the first sub-master device to control the same emission control signal.

13. The master device of claim 12, wherein the emission control signal comprises:
   a radio wave intensity value of the first sub-master device; and a first emission pattern value set to allow the first sub-master device to control an emission pattern of the first slave device when the first slave device is located in a first control radius set in accordance with the radio wave intensity value of the first sub-master device.

14. The master device of claim 13, wherein the emission control signal comprises:
   a radio wave intensity value of a second sub-master device spaced apart from the first sub-master device by a predetermined distance; and
   a second emission pattern value set to allow the second sub-master device to control the emission pattern of the first slave device when the first slave device is located in a second control radius set in accordance with the radio wave intensity value of the second sub-master device, and when the first slave device moves to the second control radius from the first control radius, the first slave device emitting the light in accordance with the first emission pattern value emits the light in accordance with the second emission pattern value.

15. The master device of claim 14, wherein, when the first slave device is disposed in both of the first control radius and the second control radius, the first slave device emits the light having an average value of the first emission pattern value and the second emission pattern value.

16. The master device of claim 14, wherein the first emission pattern value and the second emission pattern value comprise at least one of an emission timing value, an emission color value, and an emission duration time value of the first slave device.

17. The master device of claim 12, wherein the communication unit connects the master device and the first sub-master device in a wired communication network.

18. The master device of claim 12, further comprising:
   an electrical code identification unit configured to identify electrical code information previously output;
   an information check unit configured to check emission position information previously set in accordance with the identified electrical code information and indicating the first emission position at which the first slave device among the plurality of slave devices emits a light; and
   an information providing unit configured to insert the checked emission position information to the first slave device.

* * * * *